United States Patent
Vunic et al.

(10) Patent No.: US 9,141,860 B2
(45) Date of Patent: *Sep. 22, 2015

(54) METHOD AND SYSTEM FOR SEGMENTING AND TRANSMITTING ON-DEMAND LIVE-ACTION VIDEO IN REAL-TIME

(75) Inventors: Douglas W. Vunic, New Rochelle, NY (US); Eric Hoffert, South Orange, NY (US); David Gessel, Oakland, CA (US)

(73) Assignee: LiveClips LLC, El Segundo, CA (US)

( * ) Notice: Subject to any disclaimer, the term of this patent is extended or adjusted under 35 U.S.C. 154(b) by 330 days.

This patent is subject to a terminal disclaimer.

(21) Appl. No.: 13/111,738

(22) Filed: May 19, 2011

(65) Prior Publication Data

US 2012/0219271 A1  Aug. 30, 2012

Related U.S. Application Data

(63) Continuation-in-part of application No. 12/272,170, filed on Nov. 17, 2008.

(51) Int. Cl.
  *H04N 5/14* (2006.01)
  *G06K 9/00* (2006.01)
(52) U.S. Cl.
  CPC ........ *G06K 9/00711* (2013.01); *G06K 9/00765* (2013.01); *G06K 2009/00738* (2013.01)
(58) Field of Classification Search
  USPC ........................................................ 348/700
  See application file for complete search history.

(56) References Cited

U.S. PATENT DOCUMENTS

| | | |
|---|---|---|
| 5,091,780 A | 2/1992 | Pomerleau |
| 5,189,630 A | 2/1993 | Barstow et al. |
| 5,526,479 A | 6/1996 | Barstow et al. |
| 5,539,454 A | 7/1996 | Williams |
| 5,671,347 A | 9/1997 | Barstow et al. |
| 5,892,536 A | 4/1999 | Logan et al. |
| 5,923,365 A | 7/1999 | Tamir et al. |
| 5,986,692 A | 11/1999 | Logan et al. |
| 6,088,455 A | 7/2000 | Logan et al. |
| 6,144,797 A | 11/2000 | MacCormack et al. |
| 6,204,862 B1 | 3/2001 | Barstow et al. |
| 6,920,468 B1 * | 7/2005 | Cousins et al. ........................ 1/1 |
| 6,931,451 B1 | 8/2005 | Logan et al. |
| 7,055,166 B1 | 5/2006 | Logan et al. |

(Continued)

FOREIGN PATENT DOCUMENTS

| | | |
|---|---|---|
| EP | 1197020 | 11/2007 |
| EP | 1968066 A1 | 9/2008 |
| WO | 2012/155279 A2 | 11/2012 |

OTHER PUBLICATIONS

MPEG-7 Overview (version 10) (ISO/IEC JTC1/SC29/WG11N6828) Palma de Mallorca, Oct. 2004, "http://mpeg.chiariglione.org/standards/mpeg-7/mpeg-7.html", 70pp.

(Continued)

*Primary Examiner* — Dave Czekaj
*Assistant Examiner* — Leron Beck

(57) ABSTRACT

A method and system for producing video-segments of a live-action event involving monitoring a live-action event for detection of event-segments, detecting one or more event-triggers with detectors, determining if an event-segment occurred based on the detected event-triggers, and editing one or more video feeds into a video-segment to encompass the event-segment.

39 Claims, 6 Drawing Sheets

(56) References Cited

U.S. PATENT DOCUMENTS

| | | |
|---|---|---|
| 7,058,376 B2 | 6/2006 | Logan et al. |
| 7,211,000 B2 | 5/2007 | Jutzi et al. |
| 7,224,852 B2 | 5/2007 | Lipton et al. |
| 7,373,587 B1 | 5/2008 | Barstow et al. |
| 7,399,277 B2* | 7/2008 | Saidara et al. ............ 600/300 |
| 7,460,149 B1 | 12/2008 | Donovan et al. |
| 7,596,759 B2 | 9/2009 | Verna |
| 7,742,921 B1 | 6/2010 | Davis et al. |
| 7,904,797 B2 | 3/2011 | Wong et al. |
| 2002/0093591 A1* | 7/2002 | Gong et al. ............ 348/515 |
| 2002/0114493 A1 | 8/2002 | McNitt et al. |
| 2003/0160944 A1 | 8/2003 | Foote et al. |
| 2004/0064207 A1 | 4/2004 | Zacks et al. |
| 2004/0068758 A1 | 4/2004 | Daily et al. |
| 2004/0080615 A1 | 4/2004 | Klein et al. |
| 2004/0125877 A1 | 7/2004 | Chang et al. |
| 2006/0044446 A1* | 3/2006 | Porter et al. ............ 348/333.11 |
| 2006/0246972 A1 | 11/2006 | Thomas et al. |
| 2007/0100521 A1 | 5/2007 | Grae |
| 2007/0101394 A1* | 5/2007 | Fu et al. ............ 725/134 |
| 2007/0106507 A1 | 5/2007 | Charoenruengkit et al. |
| 2008/0019594 A1* | 1/2008 | Hiraizumi et al. ............ 382/190 |
| 2008/0088482 A1 | 4/2008 | Okada et al. |
| 2008/0089666 A1 | 4/2008 | Aman |
| 2008/0130997 A1 | 6/2008 | Huang et al. |
| 2008/0138029 A1 | 6/2008 | Xu et al. |
| 2008/0281592 A1 | 11/2008 | McKoen et al. |
| 2010/0245072 A1 | 9/2010 | Harel |
| 2011/0052061 A1 | 3/2011 | Jeong et al. |
| 2011/0102678 A1 | 5/2011 | House et al. |
| 2013/0283143 A1 | 10/2013 | Petajan et al. |
| 2013/0293776 A1 | 11/2013 | Shi-Fu et al. |

OTHER PUBLICATIONS

Martinez, Jose M et al., "MPEG-7: The Generic Multimedia Content Description Standard," Copyright 2002 IEEE. Reprinted from IEEE Computer Society, Apr.-Jun. 2002, pp. 78-87.

International Search report and Written Opinion mailed on Dec. 27, 2012 for International Application Serial No. PCT/US2012/038516, 9 pp.

International Search Report for International Application No. PCT/US2009/064573, mailed on Apr. 12, 2010.

Wang, F. et al., "A Generic Framework For Semantic Sports Video Analysis Using Dynamic Bayesian Networks," *IEEE, Proceedings of the 11th International Multimedia Modelling Conference*, 2005.

Sadlier, D. et al., "Event Detection Based On Generic Characteristics Of Field-Sports," *IEEE, Centre for Digital Video Processing*, Dublin City University, Ireland, 2005.

Written Opinion of the International Searching Authority for International Application No. PCT/US2009/064573, date of completion: Mar. 29, 2010.

Georgio Diamantopoulos, Michael Spann, "Event Detection For Intelligent Car Park Video Surveillance", Science Direct, available online at www.sciencedirect.com Jun. 13, 2005.

"Evaluation of Smart Video for Transit Event Detection", Project #BD549-49, Final Report, by National Center for Transit Research et al., Jun. 2009.

Tian, Yin-li et al., "Event Detection, Query, and Retrieval for Video Surveillance", Book Chapter for *Artificial Intelligence for Maximizing Content Based Image Retrieval* 2009.

Beale, Stephen et al., "Semantic Analysis in The Mikrokosmos Machine Translation Project", In Proc. Symposium on NLP, Saset Sart University, Bangkok, Thailand 1995.

Rui, Yong; Gupta, Anoop; Acero, Alex; "Automatically Extracting Highlights for TV Baseball Programs"; Proceedings ACM Multimedia; Oct. 30, 2000; pp. 105-115; XP002272069.

Supplementary European Search Report dated Sep. 25, 2014 in European Patent Application No. 12785552.6 filed May 18, 2012 by Douglas W. Vunic et al.

Written Opinion of the International Preliminary Examining Authority dated Jun. 28, 2013 in International Application No. PCT/US2012/038516 filed May 18, 2012 by Douglas W. Vunic et al.

International Search Report and Written Opinion dated Sep. 6, 2013 in International Application Application No. PCT/US2013/037545 filed Apr. 22, 2013 by Eric D. Petajan et al.

Non-final Office action dated Dec. 22, 2011 in U.S. Appl. No. 12/272,170 filed Nov. 17, 2008 by Douglas W. Vunic.

Non-final Office action dated May 23, 2013 in U.S. Appl. No. 12/272,170 filed Nov. 17, 2008 by Douglas W. Vunic.

Final Rejection dated Feb. 4, 2014 in U.S. Appl. No. 12/272,170 filed Nov. 17, 2008 by Douglas W. Vunic.

Final Rejection dated Aug. 26, 2014 in U.S. Appl. No. 12/272,170 filed Nov. 17, 2008 by Douglas W. Vunic.

Final Rejection dated Aug. 13, 2012 in U.S. Appl. No. 12/272,170 filed Nov. 17, 2008 by Douglas W. Vunic.

Notice of Allowance dated Dec. 30, 2014 in U.S. Appl. No. 12/272,170 filed Nov. 17, 2008 by Douglas W. Vunic.

D'Orazio et al., "A Review of Vision-Based Systems for Soccer Video Analysis"; Pattern Recognition; Elsevier Ltd.; vol. 43, No. 8, Aug. 1, 2010; pp. 2911-2926; XP002612059; ISSN:0031-3203; DOI: 10.1016/J.PATCOG.2010.03.009 [retrieved on Mar. 19, 2010] the whole document.

Invitation to Pay Additional Fees and, Where Applicable, Protest Fee and Annex Communication relating to the results of the Partial International Search dated Jun. 18, 2015 in International Application No. PCT/US2015/016166 filed Feb. 17, 2015 by Eric David Petajan et al.

International Search Report and Written Opinion dated Aug. 3, 2015 in International Application No. PCT/US2015/016166 filed Feb. 17, 2015 by Eric David Petajan et al.

Lu, Wei-Lwun et al.; "Learning to Track and Identify Players from Broadcast Sports Videos"; IEEE Transactions on Pattern Analysis and Machine Intelligence; IEEE Computer Society; USA; vol. 35, No. 7; Jul. 1, 2013; pp. 1704-1716; XP011510389; ISSN: 0162-8828; DOI: 10.1109/TPAMI.2012.242; paragraph [02.2].

Abdul Halin, Alfian et al.; "Soccer Event Detection Via Collaborative Multimodal Feature Analysis and Candidate Ranking"; Nov. 30, 2011; XP055204609; Retrieved from the internet: URL:http://www.iajit.org/PDF/vol.10,No.5/4565-9.pdf; [retrieved on Jul. 24, 2015]; p. 1-3.

Babaguchi, Noboru et al.; "Intermodal Collaboration: A Strategy for Semantic Content Analysis for Broadcasted Sports Video"; Proceedings 2003 International Conference on Image Processing (Cat. No. 03CH37429); Barcelona, Spain; Sep. 14-17, 2003; IEEE; Piscataway, New Jersey, USA; vol. 1; Sep. 14, 2003; pp. 13-16; XP01067054; ISBN: 978-0-7803-7750-9; p. 16.

* cited by examiner

METHOD AND SYSTEM FOR SEGMENTING AND TRANSMITTING ON-DEMAND LIVE-ACTION VIDEO IN REAL-TIME

RELATED APPLICATIONS

This application is a continuation-in-part application of and claims priority to U.S. patent application Ser. No. 12/272,170 filed Nov. 17, 2008, which was published as U.S. patent application Publication No. 2010/0123830 A1 on May 20, 2010.

BACKGROUND

By way of a simplified overview, this invention is directed to a method for segmenting and transmitting on-demand real-time video clips from live events to cellular telephones or personal computers. Live-action events, such as professional sporting events, are typically filmed using multiple cameras positioned around a stadium. Each camera produces a video feed that is then subsequently edited into a single feed that is then broadcast on television by a television network or a television station. The desire exists among viewers and fans of live televised events, such as a baseball game, to watch highlights of the game shortly after those highlights actually occur in the game. Highlights typically comprise important moments in the live-action event or the game that a viewer wishes to see again. Typically, however, viewers must rely upon the televised broadcast, as it is edited by the television network or station, to display certain highlights, such as instant-replays. Viewers typically cannot request and view highlights on-demand at substantially the same time, or within seconds or minutes of those highlights occurring in the game. Viewers also cannot typically pre-select the types of highlights—or instant replays—they wish to see. Nor can viewers typically request to view a highlight from a specific camera angle, including a camera angle that recorded the highlight, but was not used to televise that moment in the edited video-feed broadcast by the network or station. Rather, viewers must rely upon the television network or station to display the highlights that it presumes the viewers wish to see and only from the camera angles used in the edited and televised broadcast video feed. Nor can viewers of a live-action televised event typically request that the highlights they wish to see, from the camera angle they wish to see it, be transmitted to their cellular telephone or their personal computer shortly after it occurs in the game.

For viewers to be able to request to see any highlight they wish, from the camera angle they prefer, would presumptively require manual operators monitor the video feeds of live-action events. The manual operators would locate all possible highlights that viewers might wish to see. This would include highlights that the television network or station would not intend to broadcast. Upon locating what might be a highlight—such as a baseball batter swinging and missing for a third strike—the manual operator would physically edit the clip so that enough time occurs before the batter swings and after the batter swings to frame the clip so that the highlight would be meaningful to the viewer. In other words, the manual operator would have to determine how much time to place before the batter swings, as well as how much time to place after the batter swings, so that a viewer watching the clip appreciates the clip. In addition, the manual operators would have to monitor every camera angle, including the edited video feed comprising a number of camera angles that is actually broadcast to television viewers. For each camera feed, the manual operator would have to physically edit and produce a short video-clip of the highlight. Producing video-clips that contain highlights using the foregoing manner would impose considerable costs and resources on television networks and television stations or any other video management system. The costs and resources that need to be expended to manually produce a plurality of video-clips would typically be economically impractical and unfeasible.

SUMMARY

The foregoing problems are addressed by a method and system for producing video-segments of a live-action event involving monitoring a live-action event for detection of an important events or event-segments, detecting one or more event-triggers with detectors, determining if an important event or event-segment occurred based on the detected event-triggers, and editing one or more video feeds into a video-segment to encompass the event-segment.

DETAILED DESCRIPTION OF THE DISCLOSURE

Figure 1:
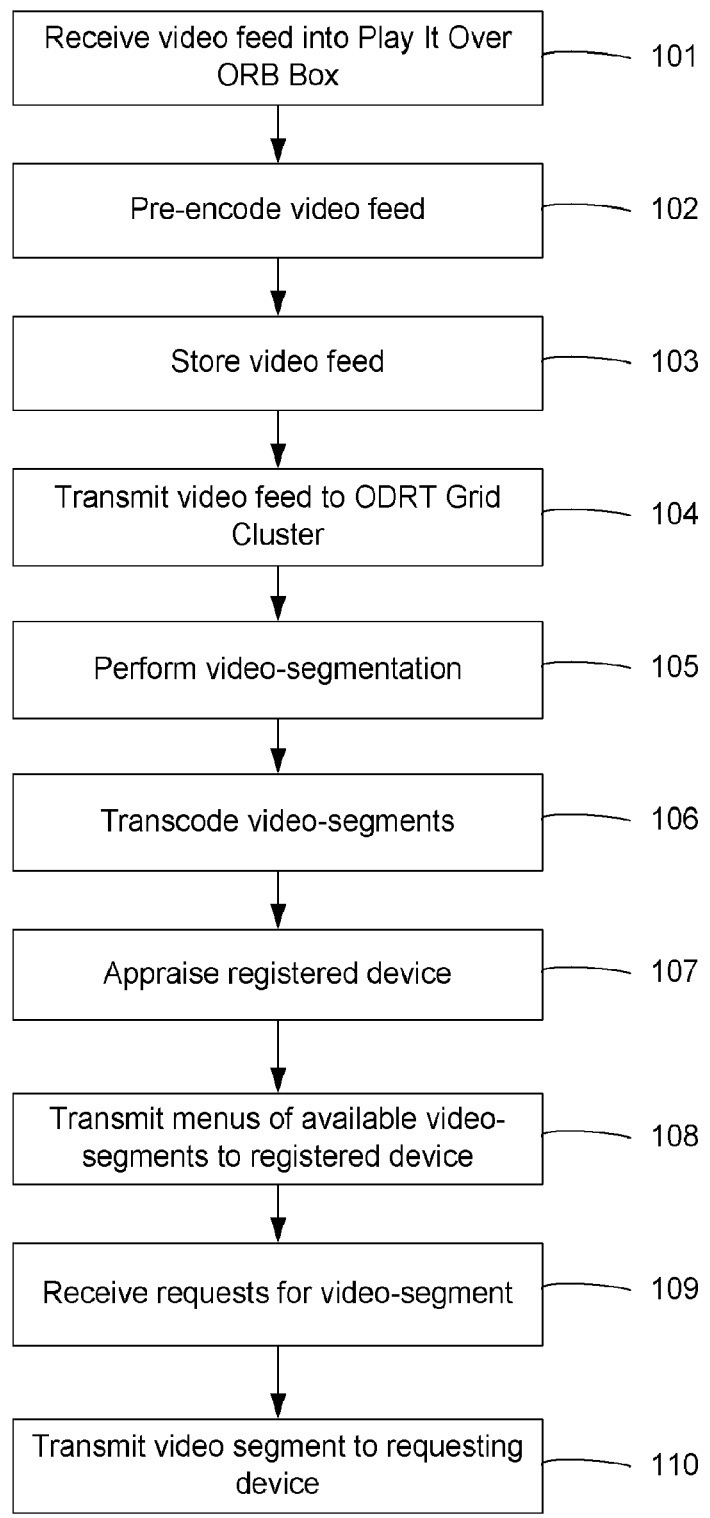
FIG. 1 is a flowchart illustrating the steps followed in performing transmitting on-demand real-time video segments of live action events.

Turning to the drawings, FIG. 1 is an illustration of the method of segmenting and transmitting on-demand live-action video in real-time. Initially, there is an event that is being filmed and broadcast live. For example, a live action event can include, without limitation, and without intending to limit the scope of the claims, a sporting event, such as a baseball game, a football game, a soccer game, a hockey game, or a car race, such as a NASCAR race. In alternative embodiments, the live event can also be a non-sporting event, such as a music concert, a theater performance, and so forth. In alternate embodiments, the live event can be interviews after a professional sporting match, include, without limitation, in a locker room, in the hallway outside of a tennis stadium, or in some other location. In alternate embodiments, the live event can be a rollercoaster at an amusement park, where a video feed captures park patrons as they roll down the steepest descent, and after exiting the roller coaster, a video-clip is transmitted to their cellular telephones. In alternate embodiments, the live event can be events back stage at a musical concert, a theater performance, or any other event for which there is a live video feed. In alternate embodiments, the live event can encompass a video feed capturing the pit crew tune-up a car in a NASCAR or Formula One race. In still alternate embodiments, the live event can encompass any live-action event captured by a live video feed.

Live sporting events are typically filmed and broadcast to viewers from a number of different angles. One or more cameras record live video content. The cameras are placed at different locations around the arena or stadium that is hosting the event. Each of the cameras continuously records the event from its respective location, and accordingly, the cameras each record the event simultaneously. To broadcast the event to viewers, a video feed from each of the cameras is typically compiled and edited to form a single edited video-feed that switches back and forth between a plurality of camera angles. For example, a televised broadcast of a live baseball game will continuously switch between a number of different camera angles while televising the broadcast in real-time.

Turning back to FIG. 1, in STEP 101, one or more video-feeds is received into a computer processor or a server. Each video-feed comprises video content that captured the live-action event. In one embodiment, each video-feed is a single video-feed. In alternative embodiments, one or more of the received one or more video-feeds is an already edited compilation of a plurality of camera angles, such as the edited video feed that viewers of a televised baseball game will typically watch on their television. In alternate embodiments, a plurality of single or pre-edited video feeds capturing video content of the same event are received. In alternate embodiments, a plurality of computer processors or servers receives the plurality of one or more video feeds of the live-action event.

In one embodiment, one or more of the video-feeds is received simultaneously with the live-action event. In alternate embodiments, one or more of the video-feeds is received at substantially the same time as the live-action event. In alternate embodiments, one or more of the video-feeds contains a delay, wherein it is not exactly synchronized with the live-action event.

In an alternate embodiment, the video-feed, whether a single video-feed or a plurality of video-feeds, whether edited or not edited, are received into an PlayItOver ORB Box (hereinafter, "Orb Box"). The Orb Box comprises a server dedicated to providing one or more services related to the method described herein. In one embodiment, the Orb Box runs a Linux operating system. In alternate embodiments, alternate operating systems are used to run the Orb Box, including, without limitation, server operating systems provided by FreeBSD, Apple, Solaris and/or Microsoft.

In STEP 102, after the computer processor, server or Orb Box receives the plurality of one or more video feeds containing pre-edited or unedited video content of the live-action event, then the processor or the Orb Box pre-encodes the video content. The computer processor comprises memory for storing the video-feeds. Typically, the video feeds received by the computer processor, server or the Orb Box are high definition and/or comprise high frame rates. Accordingly, in one embodiment, pre-encoding is performed on the input video feeds. Pre-encoding comprises, without limitation, scaling down and/or compressing the high-definition and/or high-frame rate video feeds to facilitate the method of video segmentation, as described in more detail below, via a more economical expense of computer resources. One goal of pre-encoding is to conserve available storage space and buffering capacity. In an alternate embodiment, pre-encoding, including, without limitation, scaling down and/or compressing a high-definition and/or high-frame rate video feed, is not performed. Whether or not to perform pre-encoding will generally be determined as a design-decision of the user with respect to the most economical use of available computing processing power, resources, and storage capacities.

In STEP 103, the received video feeds are stored. Means for storing the received video feeds containing video content of the live-action event, whether pre-encoded or not pre-encoded, are well-known in the art.

In STEP 104, the video feeds received by the computer processor, server or the Orb Box from the broadcaster's cameras are transmitted in real-time to another computer processor, server or cluster, such as the ODRT Grid Cluster (hereinafter, collectively, the "Cluster"). In one embodiment, the Cluster comprises two or more linked computers connected through a local-area-network. In an alternate embodiment, the Cluster comprises two or more linked computers connected through a public, private or internet network. In an alternate embodiment, the Cluster uses distributed and/or grid computing run through one or more computers. In an alternate embodiment, the Cluster comprises two or more processors connected by a local high-speed computer bus. In still alternate embodiments, the Cluster comprises additional means well-known in the art for forming a computer cluster. In still another embodiment, the received video-feeds by a server are not transmitted to the Cluster, but a design-preference of the user dictates that certain steps of the present disclosure are performed at the same processor, server and/or Cluster, based upon available processing resources and storage capacity.

In STEP 105, the Cluster performs video segmentation of the live video content. Video-segmentation will be described in more detail below with reference to FIG. 2. The result is a video-segment, or a video-clip containing an event-segment, or an important event, or a highlight from the live action event, along with attendant metadata that describes the highlight.

In STEP 106, a segmented video clip, or a video-segment, with attendant metadata, is transcoded. In one embodiment, digital data representing the video and audio content of the segmented clip (or video-segment), and its attendant metadata, is transcoded, or modified from a digital video stream having one set of characteristics to a digital video stream having an alternate set of characteristics. As is generally known in the art, different sets of characteristics pertain to different protocols (e.g. compression protocols, including, without limitation, MPEG and MPEG2) and data rates. A segmented video clip (video-segment) is transcoded into a number of pre-selected and/or predetermined encoding schemes. An encoding scheme comprises the specific protocols for compressing, forward error-correcting, modulating and/or transmitting digital or analog data. Pre-selected encoding schemes are initially designated to conform to the operating system and formats used by the plurality of cellular telephone network carriers and devices, as well as personal computers receiving video content over the internet. Transcoding is described in more detail below.

In STEP 107, a registered device is appraised with respect to a plurality of characteristics. Registered-device appraisal determines the optimal parameters (i.e., encoding scheme) for which to transmit the segmented video-clip to the requesting device. Registered-device appraisal of a requesting user's device is described in more detail below. In STEP 108, pursuant to the determined appraisal of registered devices, menus containing a selection of video-segments that are available for display are transmitted to a device. This step is described in more detail below with reference to FIG. 5. In STEP 109, requests to view a specific video-segment is received. In STEP 110, the requested segmented video-clip (video-segment) is transmitted to the requesting device.

It will be appreciated by those skilled in the art that in alternate embodiments, the steps of pre-encoding, storing, transcoding, transmitting to an alternate processor or server for video-segmenting, as well as other steps disclosed herein with respect to FIG. 1 are not required to follow a chronological order that mirrors the order of the steps as disclosed herein, as set forth in FIG. 1, nor as the relevant steps and elements are set forth in the claims. Design-decisions pursuant to the user's preferences with respect to processing capabilities and storage capacity can be made to perform pre-encoding, transcoding, video-segmenting, storage and additional elements and steps in a chronological order that differs from the order of the elements and steps set forth above, in FIG. 1, or in the claims. It will also be appreciated by those skilled in the art that in another alternate embodiment, multiple steps, including, without limitation, the steps disclosed herein with reference to FIG. 1, can occur simultaneously pursuant the user's available processing capabilities.

Figure 2:
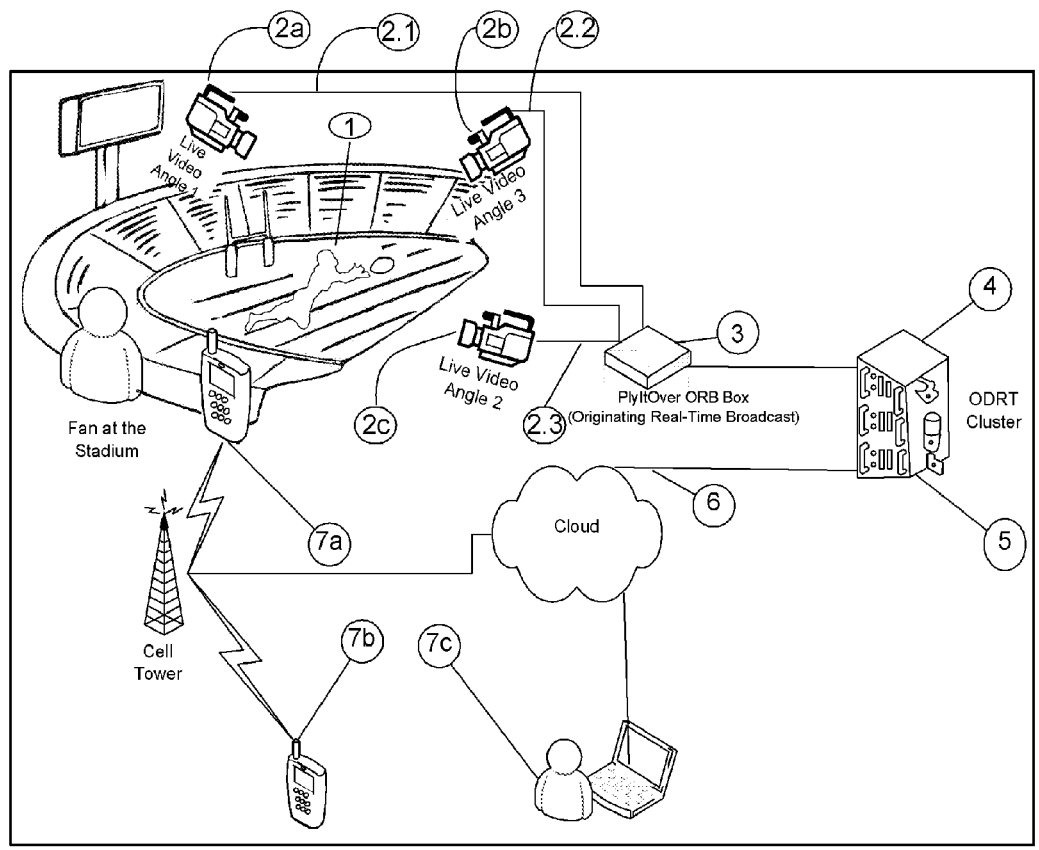
FIG. 2 is a diagram illustrating an embodiment of a system for transmitting on-demand real-time video segments of live action events.

Turning to FIG. 2, this is an illustrative embodiment of an embodiment of the system corresponding to the method disclosed with reference to FIG. 1. Initially, there is a live-action event 1 that occurs inside of a stadium or arena. In this particular embodiment, which comprises an example, and is not intended to limit the scope of the claims, live-action event 1 comprises a football game. Multiple cameras 2, including live-video angle 2a, 2b and 2c, are positioned around the stadium hosting the live-action event 1. Video feeds from each camera, 2a, 2b, and 2c, are received via lines 2.1, 2.2, and 2.3 to the PlayItOver Orb Box 3. In alternate embodiments, lines 2.1, 2.2, and 2.3 are not required to be individual serial direct connections input into the Orb Box, but can encompass parallel and/or multiplexed connections or additional types of connections of one or more video feeds into the Orb Box, as is generally known by those skilled in the art. The Orb Box 3 pre-encodes each of the received video-feeds, scaling them down from high-definition, high-frame rates, and then stores the pre-encoded video-feeds. The ODRT Cluster 4 receives the pre-encoded video-feeds and performs video-segmentations, which is described in more detail below, to determine when to trim each video-feed so that it includes a game highlight, or another event determined to be segmented into a video clip. Meta-data 5 is added to the trimmed video-clip (or video-segment), and it is then transmitted to a plurality of registered requesting end-user devices, which can include iPhones 7a, cellular telephones 7b or personal computers 7c.

Video Segmentation

Figure 3:
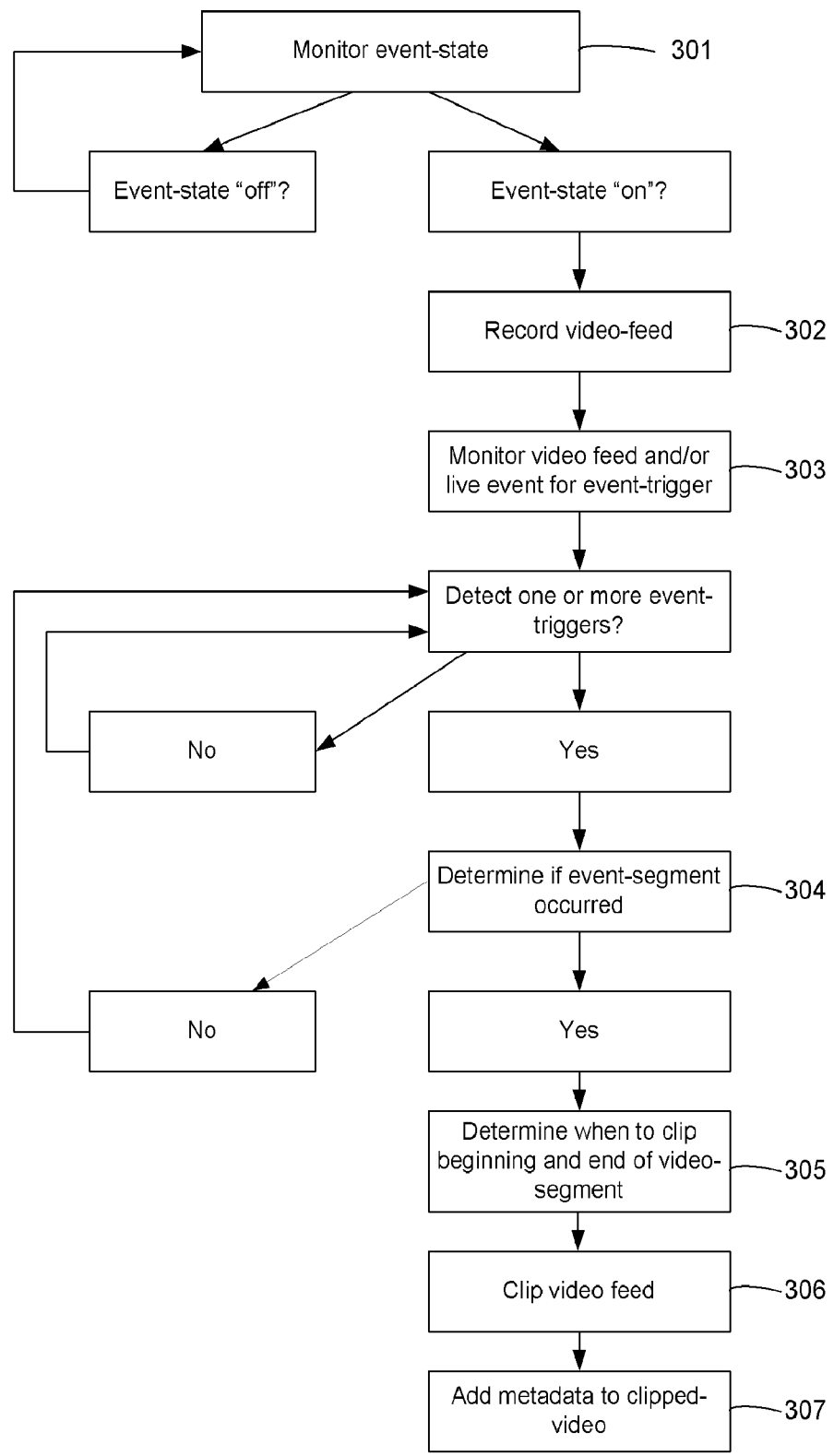
FIG. 3 is a flowchart illustrating the steps followed in performing video-segmentation.

The method of video-segmentation will now be described in more detail. FIG. 3 illustrates the steps of a method directed to segmenting the live video feeds into individual clips. By way of a brief descriptive overview, first it is determined if the event-state is on or off, and if it is on, the received video feeds are recorded. Typically, if a baseball game is experiencing a commercial break, the event-state will be determined to be off, and the video-feeds will not be recorded. When the event-state is on (for instance, when the baseball game is in play) then different types of detectors monitor both the live video feed and/or the live physical action occurring at the live-action event for detections of events that might be something viewers would prefer to see again, hereinafter referred to as "event-triggers". Event-triggers comprise detections that exceed or are beyond a predetermined threshold or value that indicates that something important, or worth watching, is happening in the live-action event. Detected event-triggers may be indicative of an event that requires video-segmentation because it is something viewers would prefer to see again. By way of an example, and without intending to limit the claims, typically, baseball fans are interested in viewing a batter swinging and hitting a homerun. On the other hand, typically, fans are less interested in viewing a batter swinging a bat before stepping up to the plate. Detectors monitor the video feed and/or the live-action event for event-triggers that are indicative of the batter hitting a homerun rather than swinging a bat before stepping up to a plate. In this example, hitting a home run would comprise an important event, or an "event-segment", whereas simply swinging the bat before stepping up to the plate would not. Both swings of the bat, however, would comprise "event-triggers." Event-segments are events that are determined to be segmented into a video-segment. By way of an example, and without intending to limit the scope of the claims, a radar gun monitors increased changes in bat velocity, and thus, a bat swinging constitutes an event-trigger. A bat swinging might be indicative of an event-segment, i.e., a homerun, or it might not be indicative of an event-segment, i.e., a batter warming up by swinging the bat before stepping up to the plate. By way of additional examples, and without intending to limit the scope of the claims, event-segments can comprise: the last 30 seconds of a video shot from the goal in a hockey game, or in the alternative, from the goalie's helmet; a short video of a user on a rollercoaster at the point of the steepest descent; sports locker-room interviews; an interview backstage at a musical concert; cheerleaders doing flips; the last-lap video from inside a car in a car race; and so forth.

One or more event-triggers are therefore used to determine if they are indicative of an event-segment. If so, the time of the event-segment—in the foregoing example, the batter hitting a homerun—is recorded, and the recorded video-feed is trimmed to begin and end so that the trimmed video-clip includes the event-segment. Additional metadata is added to the trimmed video-clip that describes information about the video-segment, such as, in this example, the player's name and that he hit a homerun. The result is the trimmed video-clip recorded from the live video feed that contains the event-segment, as determined by the plurality of one or more event-triggers. As indicated above, the trimmed video-clip with the added metadata will be referred to as a "video-segment".

A brief overview of FIG. 3 is as follows: In STEP 301, the live-action event or the plurality of one or more video-feeds or both are monitored to determine the event-state. If the event-state is determined to be "on", rather than "off", then in STEP 302, recording of the live-action video feed is performed. In STEP 303, the live-action event or the recorded video feed is monitored for event-triggers. In STEP 304, upon detection of one or more event-triggers, the time of the event-triggers is recorded, and those event-triggers are used to determine whether an event-segment has occurred. If it is determined that an event-segment has occurred, in STEP 305, it is determined when the recorded video is to be clipped to begin at a specific time and to end at a specific time. In STEP 306, the recorded video is clipped according to the determinations in STEP 305. In STEP 307, metadata is added to the trimmed video-clip, and the resultant product is a video-segment.

At this point, in one embodiment, the process continues to monitor the live-action event for event-triggers that are indicative of additional event-segments that can be clipped into video-segments. By way of an example, and without intending to limit the scope of the claims, in a baseball game, if a pitch resulting in a foul ball is clipped into a video-segment, then the process continues to monitor the live-action event or the video-feed for the next event-segment, which in this example, will most likely constitute the next pitch. In one embodiment, the process returns to STEP 301 to determine if the event-state is "on" or "off" or an analogous user-defined determination with respect to the event-state. In an alternate embodiment, the process returns to STEP 303, where the live-action event or the recorded video feed is monitored for event-triggers indicative of another event-segment that can be segmented into a video-segment. In alternate embodiments, after each video-segment is clipped, the process returns to STEP 303 while simultaneously monitoring the event-state, and in the event that the event-state is determined to be "off", then following segmentation of a video-segment, recording of the video-feed stops and the process does return to STEP 303 only at a subsequent time when the event-state is again determined to be "on".

In STEP 301, the video feed is monitored to determine the event-state. An event-state indicates whether a live-action event is actively proceeding or whether an intermission is occurring. Live-action events, such as sporting events, typically oscillate between being active or non-active is some relative form. For instance, if a musical concert is being televised live, then a commercial break or a televised intermission does not correlate to an event that a user would likely wish to see again. Similarly, users may also not wish to clip into an event-segment the duration of a time-out during football game or basketball game. Similarly, a commercial break during a baseball game does not likely contain any event-triggers.

Users determine as a design choice what does and does not constitute an event-state. This design-choice will be based upon the respective live-action event or sporting event for which video segmentation is being used. In some instances, the entire event constitutes a single, unchanging event-state, such as "on". By way of an example, and without intending to limit the scope of the claims, the first set of a live televised musical concert that runs uninterrupted may constitute a single event-state. Thus, in this example, recording of the entire first act would continue uninterrupted, and as will be described in greater detail below, pursuant to a user's preferences, the concert is monitored for event-triggers indicative of event-segments. Event-segments may constitute individual songs, and the recorded video-feed is clipped into video-segments that each encompass an individual song played during the set of the concert before intermission. At intermission, the event-state is determined to be "off", and recording is halted until the event-state is once again determined to be "on", i.e., the band has returned to the stage. Users therefore determine as a design-choice those event-states likely to contain event-triggers and those unlikely to contain event-triggers.

In one embodiment, to determine an event state, the clock is monitored. For many sporting events, a clock controls when a sporting event is "in play" and the remaining time before the respective game, quarter, period, half and so forth expires. Typically, the clock will be stopped during play for a time-out, for a commercial break, or for some other reason. By way of an example, and without intending to limit the scope of the claims, when the first quarter in a basketball game ends, the clock expires, after which there is no play. This expiration of the clock is detected to distinguish between an event-state that is "in play" and one that is "not-inplay", or equivalent designations that indicate whether or not to advance to STEP 302. By way of another example, and without intending to limit the scope of the claims, if the clock starts in a football game following a time-out, that will indicate the game is once again "in play". In alternate embodiments, the event-state is not determined with reference to a clock, but with reference to another indication of whether or not the game is "in play" or not. By way of an example, and without intending to limit the scope of the claims, if the scoreboard in a baseball game indicates that it is the top of the first inning, then the game is "in play", but if the scoreboard indicates that no inning is being played or that the "7th inning stretch" is underway, then presumptively, the game is "not in play". In an alternate embodiment, the event-state is not determined. Rather, this step is skipped and the procedure advances immediately to STEP 302, where recording of the live video feed continues without break. Whether or not to deploy a step of determining an event-state is a design choice that will typically be based around conservation of processing and storage resources.

STEP 301 thus comprises constantly monitoring of the live-action event or the video feed to determine when the event-state is on, at which point the procedure advances to STEP 302. When the event-state is off, the procedure continues to monitor the event-state until it is "on" again. It will be understood by those in the art that the designations "on" and "off" are by way of an example, and not intended to limit the scope of the claims, and to the extent the user determines as a design choice what does and does not constitute an event-state, the designations chosen to distinguish between two event-states is also at the design-discretion of the user. In STEP 302, presuming the event-state is "on", or something analogous, then the received live video feeds are recorded.

In STEP 303, the live video feeds, the live-action event, or both are monitored to detect event-triggers using the following means for detecting event-triggers. In general, sensors and detectors monitor the video feeds and/or the live-action event pursuant to means described in more detail below. The detectors monitor for measurements or detections of values that exceed a predetermined threshold. A detected measurement that exceeds a predetermined threshold is assigned a value to the extent the specific event-trigger (measured value) exceeds the predetermined threshold. This value corresponds to a weight. In one embodiment, the more the detected value exceeds the predetermined threshold, the higher or greater the value assigned, and the higher or greater the corresponding weight. This weighted value is subsequently used along with additional weighted values, which correspond to additional event triggers using the same or additional detectors, to determine if and when an event-segment occurs. In one embodiment, the weight assigned to each of a plurality of values derived from additional detectors detecting event triggers indicates the degree of relative priority to give to each specific value when determining whether, in the aggregate, the plurality of detected event triggers indicate that an event-segment has occurred. By way of an example, and without intending to limit the scope of the claims, in a baseball game, the ball is monitored with a radar gun. If a pitch is detected to be 45 m.p.h., then it is too slow to be an actual pitch, and it is presumptively just the catcher throwing the ball back to the pitcher. Its speed will not exceed a predetermined value, and an event-trigger has not occurred. On the other hand, if a pitch exceeds a predetermined value of 80 m.p.h., then an event-trigger occurs, because at that speed, it is presumed that the pitcher threw an actual pitch. If the pitch is 100 m.p.h., then it far exceeds the threshold value for event-triggers, and it is likely a fast ball that more likely corresponds to an event-segment because the batter is likely to swing and miss.

Frame by Frame Pattern Recognition

Frame by frame pattern recognition monitors video feeds for motion changes in the live action captured by the video feed. Frame by frame pattern recognition for pre-encoded and non-pre-encoded video content is well-known in the art.

In one embodiment, successive frames of a video feed are compared, and pixel color changes are detected. The number of instances of pixel color changes are monitored to determine if the number of pixel color changes exceeds a predetermined threshold. In an alternate embodiment, only those individual pixel color changes that exceed a difference in color intensity above a predetermined value are counted among the pixel color changes used to determine whether in the aggregate, the total number of pixel color changes exceeded a predetermined threshold. In an alternate embodiment, rather than monitoring successive frames, every second, third and so forth number of frames are compared. In an alternate embodiment, the distribution of pixel color changes is monitored. By way of an example, and without intending to limit the scope of the claims, the distribution of a single pixel color is monitored for changes above a predetermined threshold by converting the distribution of the single color (such as all green pixels) into a frequency distribution and monitoring changes in the frequency distribution, where frequency pertains to the frequency with which the color green appears within each frame. In alternate embodiments, frequency distributions of multiple colors or patterns of colors are monitored.

In an alternate embodiment, the number of pixel color changes that are monitored are localized within a selected portion of the image captured by the video feed. Thus, by way of example, and without intending to limit the scope of the claims, a video feed capturing a football game is monitored for the number of pixel color changes along the line of scrimmage. Typically, televised football games, including network feeds, impose a computerized blue line upon the televised image of the football game to indicate for the television viewer where the line of scrimmage exists on the football field for a specific play. In one embodiment, the line of scrimmage is located by detecting a high concentration of blue pixels in a specific area or region of the frame. Alternatively, in the event the super-imposed computerized line of scrimmage is a color other than blue, the video feed detects high concentrations of that color to locate the line of scrimmage. Video feed frames are then monitored within a predetermined localized area within the vicinity of the superimposed computerized line of scrimmage. Because movement indicating that a football play has begun typically involves players on both sides of the line of scrimmage crossing that line, it is sufficient to monitor only a localized area within the proximity of the line of scrimmage for pixel color changes to detect event-triggers.

Figure 4:
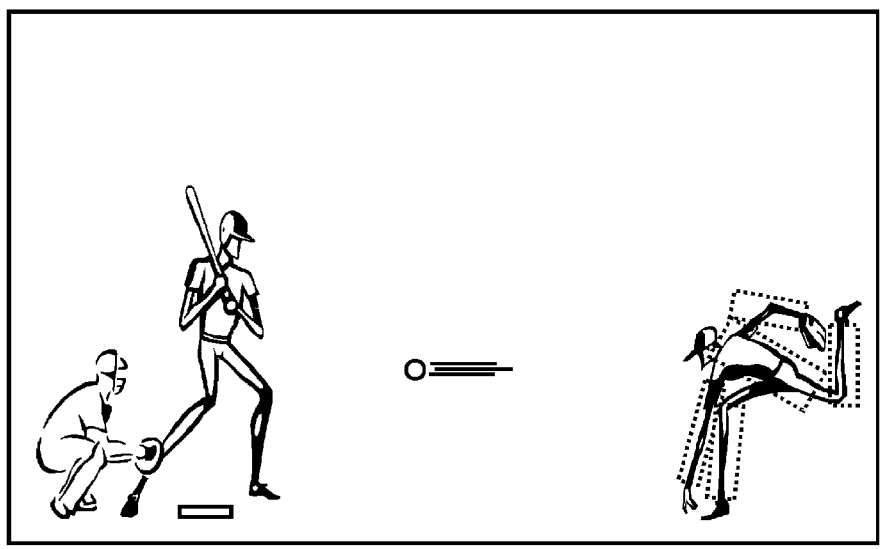
FIG. 4 is an illustration of one-embodiment of frame-by-frame pattern recognition that is used in conjunction with one-embodiment of the disclosed method of video-segmentation.

By way of an example, and without intending to limit the scope of the claims, FIG. 4 is an illustration of a frame from a video-feed that captures a pitcher in a baseball game delivering a pitch. For each successive frame in the video-feed that captures the pitcher delivering the pitch, including the frame depicted in FIG. 4, the pitcher is localized within the frame, and basic geometrical shapes and/or patterns are mapped onto the pitcher's body and limbs to encompass each of the pitcher's limbs. In one example, where the pitcher is wearing a white uniform, high concentrations of the color white are located and geometrical boxes are used to encompass those high concentrations. It is a design-decision for the user to determine the degree to which the geometrical shapes encompass the pitcher's limbs without simultaneously encompassing portions of the frame that do not capture the pitcher's limbs, i.e., the green grass. For successive frames, geometrical shapes are therefore mapped onto the pitcher's body. In alternate embodiments, rather than each successive frame mapping geometrical shapes onto the pitcher's body, every second, third and so forth number of frames are mapped with geometrical shapes encompassing the pitcher's body and the pitcher's limbs. Accordingly, as the pitcher makes his way through his wind up in his effort to eventually deliver the pitch, the aggregate geometrical shapes mapped onto the pitcher's body limbs will produce a configuration for each successive frame that is different. In other words, if each of the pitcher's limbs and his torso are mapped with a rectangular shape imposed upon the frame, the resulting configuration of rectangles will be different for each frame as the pitcher contorts his body differently to successively work his way through his windup. Thus, the pattern of geometrical shapes configured for each frame that encompasses each successive stage of the pitcher's wind-up and delivery changes between successive frames. Those patterns of geometrical shapes are monitored. When that pattern corresponds to a predetermined pattern, then an event trigger is registered. In this example, referring again to FIG. 4, the pattern of geometrical shapes encompassing the pitcher's body that results when his leg goes up into the air is the event-trigger. Successive frames are therefore monitored for this pattern, or an approximation of this pattern. Upon detection of this pattern, or an approximation of this pattern, an event-trigger is registered. As is clear from FIG. 4, the raised leg of the pitcher, and the resultant geometrical pattern that results, is most likely an indication that the pitcher is throwing a pitch. It is a design-decision for the user to determine, with respect to the geometrical pattern that constitutes the event-trigger, the degree and extent to which approximations of that pattern also constitute an event-trigger. In alternate embodiments, the geometrical shapes used to map onto a pitcher's or another player's body or limbs is not limited to rectangles, but also includes, without limitation, other shapes reasonably contemplated to efficiently encompass the person or object that is monitored for changes. These other geometrical shapes include circles, boxes, non-four-sided shapes, hexagons, and so forth. In an alternate example, and without intending to limit the scope of the claims, in a golf game, a pattern of geometrical shapes mapped onto a golf player hitting a golf ball is predetermined to constitute a certain position in a golf player's swing that constitutes an event-trigger. As an example, the pattern constituting an event trigger could be one that corresponds to rectangles mapped onto a golf player's body when he or she is at the back of his or her swing, and the golf club has been brought up over the shoulders and the line of the club is momentarily parallel with the ground. As an alternate example, for a music concert, a rock musician is notorious for holding a guitar and jumping up in the air with his legs spread in a signature style. Geometrical shapes are mapped onto successive frames of the video-feeds capturing the rock musician during the concert. The patterns of those geometrical shapes are monitored until they correspond to the predetermined pattern, or an approximation thereof, of geometrical shapes that correspond to the rock musician jumping in the air with a guitar and his legs spread in his signature way.

By way of an alternate example, and once again, without intending to limit the scope of the claims, a video feed capturing a baseball game is monitored for the number of changes within the strike zone only. Typically, a pitcher delivering a pitch will throw the baseball within the vicinity of the strike zone, which comprises an area in front of both the batter and the catcher. In this example, the strike zone is detected based upon a pixel-color distribution that correlates with predetermined pixel-color frequency distributions that indicate it. For example, the strike zone is monitored for pixel color changes exceeding a predetermined threshold.

By way of an alternate example, and once again, without intending to limit the scope of the claims, a video feed capturing a race-car race, such as a NASCAR race, is monitored for pixel color changes indicating two or more cars have moved relative to each other on the race-track. Typically, a video feed capturing a car race follows one or more cars advancing around the track, and by following the cars, the cars remain relatively fixed on the screen relative to the sides of the video image, or the frame, for at least a portion of time.

Detecting certain concentrations of pixel colors enables a car to be located in a video feed. Similarly, certain concentrations of pixel colors enables the physical track, the protection wall, and the center area of the track to be located as well. Accordingly, if a video feed is following two cars moving down a straightaway on the track, the two cars are located, the track between the two cars is located, and a value is assigned to the number of pixels comprising the track located between the two cars. This value is monitored to determine whether it falls below a predetermined threshold within a specific number of frames. If so, this is likely to indicate that one car is advancing quickly upon the other car. To that extent, an additional value is determined that is weighted relative to how quickly the value indicating the space of track between the two cars changes relative to the number of frames. As described in more detail below, this weighted value is used, along with additional weighted values to determine if an event-segment has occurred. In this example, an event-segment would be one car passing another car on the straightaway.

By way of an alternate example, and once again, without intending to limit the scope of the claims, a video feed capturing a soccer game is monitored for pixel color changes for a given color, or a finite spectrum indicating a given color, which indicates rapid, swift and sudden movement of the video camera capturing the video feed. In one embodiment, frames are compared and a frequency distribution of pixel colors is determined across the entire frame. The frequency distribution is monitored for changes exceeding a predetermined threshold. Alternatively, a predetermined spectrum that indicates the color green, or whatever color may be the color of the field is used. If a frame or collection of successive frames indicates a high frequency distribution of green pixels for a given period of frames, then this presumptively indicates that the players are passing the ball around mid-field, or something uneventful. The frequency distribution of green pixels changes slightly as the ball progresses down the field, but not necessarily dramatically. Sometimes, when a player kicks the soccer ball at the goal, the camera follows the ball towards the goal. Doing so, video feed image captures the goal, the area behind the goal, and spectators in the stands. The resulting image will most likely not contain a high frequency distribution of the color green. The frequency distribution for green will therefore drop dramatically (below a predetermined threshold) within a predetermined period of frames. The extent to which this frequency distribution drops below a predetermined threshold within a predetermined frame period is assigned a value, which will correspond to a weighted parameter input. Along with additional weighted parameters, to be described in more detail below, it will be used to determine if an event-segment (i.e., in this example, a shot on goal) has occurred.

By way of an alternate embodiment, frame-by-frame pattern recognition techniques well-known by those skilled in the art that perform face recognition is used to detect event-triggers. For instance, without intending to limit the scope of the claims, if a golfer appears on the video-feed, and the golfer does not wear a number, a uniform or any other article of clothing that identifies him or her with a respective team or other organization, frame-by-frame pattern recognition using face recognition techniques can identify the golf player. Face recognition techniques and algorithms are well-known in the art. In alternate embodiments, frame-by-frame pattern recognition techniques using well-known OCR algorithms detect predetermined information within a video-feed frame. By way of an example, and without intending to limit the scope of the claims, an OCR algorithm detects the number worn by a specific player. That number can be algorithmically compared to a predetermined database of numbers that each correspond to a specific player, and along with additional event-triggers and information, a determination is functionally made with respect to the name of the player that is captured in video-feed. In alternate embodiments, video-filtering algorithms well-known by those skilled in the art can be applied to the video-feed to exacerbate, amplify or de-emphasize pre-selected color and/or pixel color distribution gradients within the video-feed frame, thereby facilitating the implementation of video-filtering and textual-filtering algorithms, such as an OCR program, to search for and find numbers, textual data, face detection programs to detect faces and other algorithms to detect other information within a frame that corresponds to event-triggers or additional information to determine if, when and what event-segment occurred. In this way, multiple, different event-triggers can be detected using a number of different detectors from within a succession of frames that do not segue between scenes, camera angles or fades to black.

Physical Sensors

Physical sensors located at the premises hosting the live-action event captured by the video feed monitor changes in the live action event without recourse to the video feed itself. In one embodiment, physical sensors located at the live-action event monitor changes that exceed a predetermined threshold. A value is assigned to the extent to which those changes exceed the predetermined threshold, and that value corresponds to a weighted parameter input, which, along with additional parameters, as herein described, is used to determine if an event-segment has occurred.

By way of an example, and without intending to limit the scope of the claims, radar guns monitor the speed of pitches to detect those that exceed a predetermined threshold. By way of another example, and without intending to limit the scope of the claims, a radar detector detects movement—namely a running batter—between third-base and home base, which presumptively indicates that an important play is happening. By way of another example, and without intending to limit claims scope, a radar detector monitors cars exceeding a predetermined speed in a race, presumptively indicating that one car may be attempting to pass another car or one car may be making some other sort of strategic move along the race-track that will be an event-segment. In an alternate embodiment, Global Navigation Satellite Systems, including GPS, are used to detect the time, location and velocity of participants in a live-action event. By way of an example, and without intending to limit the scope of the claims, race-cars equipped with GPS monitor each car's position for whether it is approaching the finish line or whether one racecar is swiftly approaching another racecar. By way of an alternate example, and without intending to limit the scope of the claims, marathon or other long-distance runners are equipped with RFID tags within their shoes that absorb specific electromagnetic fields and/or frequencies that trip detectors for detection that a runner is at a specific location at a specific time. In alternate embodiments, motion-detection and velocity-detection mechanisms well-known in the art are used to detect event-triggers. Except where otherwise stated, the claims are not intended to be limited to physical sensors in the form of radar detectors or other types of detectors that use microwaves, radio waves or any other type of electromagnetic waves or sound waves deployed in any form to detect and measure range, altitude, direction, and/or speed of people, players or objects in a live-action event or sporting event.

In alternate embodiments, the video-feed is monitored for detections by physical sensors that are inherent to the game or live-event that is being filmed. By way of an example, and without intending to limit the scope of the claims, in a football game, the possession arrow is monitored to indicate changes in possession. Upon detecting that the possession arrow has changed, an event-trigger is registered because it is most likely that an event-segment, such as a fumble or an interception, has occurred.

Audio Recognition

Audio and speech recognition monitors the audio component of video feeds for changes in the live audio captured by the video feed. Audio and speech recognition for pre-encoded and non-pre-encoded audio content is well-known in the art. By way of an example, and without intending to limit the scope of the claims, a video feed capturing a soccer game is monitored for significant changes in the announcer's voice. Typically, a video feed capturing a soccer game contains an audio feed that principally comprises an announcer commenting upon the live-action of the soccer match. Often, an announcer will raise his or her voice in the event that a goal is scored. In this embodiment, changes in decibel levels above a predetermined threshold are monitored. Other times, it is not uncommon for an announcer to shout the word "Goal!", or whatever word that signifies a goal in the language spoken by the announcer, for an extended period of time, sometimes on the order of 15 to 30 seconds, or more. Therefore, in an alternate embodiment, independently or in addition to monitoring the decibel level of the audio feed, the period of time that the decibel level of the audio feed exceeds a predetermined threshold is monitored. In an alternate embodiment, the time that the audio feed remains within a predetermined vicinity of any decibel level is monitored. To the extent this time exceeds a predetermined threshold time, it can presumptively indicate that the announcer is shouting "GOAL!", and that an event-segment may have occurred. In this embodiment, therefore, time, rather than a decibel level, is monitored. As mentioned, alternative embodiments measure both time and decibel levels with predetermined weightings relative to each other to assign a value to the extent to which any or all of the measured values exceeds the predetermined thresholds. In an alternate embodiment, the decibel level of the crowd at the stadium or arena where a live-action sporting event is occurring is monitored for changes above a predetermined threshold to indicate that an event-segment may have occurred because everybody is suddenly cheering.

In an alternate embodiment, independent or in addition to other audio monitoring technologies, speech recognition software well known to one skilled in the art may be employed to convert broadcast speech to text; this method may be deployed for multiple languages (i.e., English, Spanish, Italian) depending on the origin of the broadcast content. In one embodiment, speech to text capability enables recognition of specific trigger words related to what may have occurred during the possible event-segment with different sets of trigger words corresponding to different sports. By way of an example, and without intending to limit the scope of the claims, recognition of the specific trigger word "homerun" for a baseball game when spoken by an announcer can be used as an event-trigger to possibly indicate that a batter has just hit a homerun. In another embodiment, speech to text capability enables recognition of specific trigger words related to who may have been involved during the possible event-segment. By way of an example, and without intending to limit the scope of the claims, recognition of the specific trigger words "Derek Jeter" when spoken by an announcer can be used as an event-trigger to possibly indicate that Derek Jeter was involved in the recent occurrence in the live-action event, such as a homerun. In another embodiment, speech to text capability enables recognition of specific trigger words related to certain statistics as an event-trigger to possibly indicate an event-segment. By way of an example, and without intending to limit the scope of the claims, recognition of specific trigger words "70th homerun" and "this season" when spoken by an announcer within a predetermined range of time can be used as an event-trigger to possibly indicate that a batter has just hit his 70th homerun for the season. In another embodiment, recognition of speech related to certain textual scenarios can be pre-designated to be assigned greater weighting values for the purpose of algorithmically determining if an event-segment has occurred. For example, because few if any baseball players have ever hit 70 homeruns within a single season, and users are therefore most likely interested in viewing a video-segment involving a player that has performed this feat, then speech recognition that corresponds to a certain textual scenario, arrangement or group of one or more words that would correspond to this feat, can be assigned comparatively high weighting value. In another embodiment, one or more of the foregoing speech to text event-triggers, including, without limitation, what happened, who did it, and statistics regarding the same, can be used together to more accurately determine whether an event-segment has occurred.

In another embodiment, additional speech to text event-triggers and non-speech to text event triggers are used in combination in order to assess the likelihood that certain recognized speech corresponds to the same event-segment occurring at the time the speech is articulated by the announcer. By way of an example, and without intending to limit the scope of the claims, during a baseball game, if a player hits a particularly impressive homerun, it is not unlikely that several minutes after the homerun occurred, the announcer will still be talking about it. For instance, even if a new inning has commenced, the announcer may remark, "That was a very impressive homerun that Derek Jeter just hit." In this case, in the absence of additional constraints upon the disclosed method for determining whether an event-segment occurred, speech to text recognition may indicate that based upon the announcer's remarks, Derek Jeter hit a homerun at or around the time the of the announcer's recorded speech. Yet, this will not be the case. For this reason, event-triggers based upon speech to text recognition can compare the speech to text event-triggers with additional contemporaneously detected event-triggers to determine if the speech can be accurately paired with the contemporaneous event-segment. Continuing with the foregoing example, at the recorded time that the announcer remarked, "That was a very impressive homerun that Derek Jeter just hit", additional event-triggers are detected. First, the external metadata detects that a different player is at bat and that a team not corresponding to Derek Jeter's team is at bat. Second, audio detectors detect that the decibel level among the crowds is comparatively low. Third, scoring information detectors detect that the number of runs scored by each team has not altered or changed in 15 minutes, and that the current batter currently has one strike. Fourth, the event-state was detected to have changed from "off" to "on" 45 seconds earlier, which could indicate that the broadcast of the game just returned from a commercial break or a between inning break less than 45 seconds earlier. In this embodiment, additional detected event-triggers are used to confirm or deny the likelihood that the event-segment possibly detected by speech to text recognition corresponds to the likely event-segment corresponding to additional detected event-triggers detected contemporaneously with the speech to text recognition event-triggers. Continuing with the foregoing example, in one embodiment, contemporaneously detected event-triggers are entered into a predetermined user-designed profile to correspond to what may actually be occurring within a range of time within which several event-triggers are detected. If the foregoing event-triggers, numbered one through four, detect the following information, David Ortiz, who plays for the Red Sox, is at bat, with one strike, and the inning began 45 seconds earlier, and the last run scored was 15 minutes earlier, which was based on a homerun by Derek Jeter, then all or some of this information is entered into a predetermined profile. This information will populate the profile. For instance, if the profile contains an entry for "current batter", which would correspond to the most likely batter to be at bat contemporaneous with detection of one or more event-triggers within a pre-designated range of time, then based on foregoing detected external metadata, the entry will be filled with "David Ortiz". Additional entries will also be populated respectively with the foregoing information. Then, within the same pre-designated range of time, the speech to text recognition capability detects the announcer's remarks, "That was a very impressive homerun that Derek Jeter just hit," and based upon that event-trigger populates the current batter profile with "Derek Jeter". In that case, a pre-designated user-designed rule, which indicates that no more than one batter can be detected to be at bat during a given pre-designated time range, will indicate that because two different batters have been designated to be at bat during the same time range—David Ortiz and Derek Jeter—this discrepancy needs to be resolved. In this case, a further step will determine whether either of these two batters was recently populated in the "current batter" entry in another earlier profile. If it is determined that "Derek Jeter" was populated in the "current batter" entry in a profile 15 minutes earlier, and it is also determined that "David Ortiz" was populated in the "current batter" entry in a profile 90 seconds earlier, then each of these time periods since the last time that each player was populated in a "current batter" entry in a profile will be assigned a weighted value, which in this example, will be inversely proportional to the length of time lapsed since last population, such that David Ortiz will receive a greater weighted value then Derek Jeter. In another embodiment, if David Ortiz and Derek Jeter are each populated in the current batter profile for a given time range, but comparisons to earlier profiles determine that Derek Jeter was previously at bat during the game, but David Ortiz has yet to be at bat, then this information will be weighted accordingly to favor a final determination that it is actually David Ortiz that is currently at bat, and the speech to text recognition that Derek Jeter is currently at bat corresponds to an earlier event-segment. Continuing with this example, additional profile entries with a greater than allowed number of entries will be resolved by pre-designated user-designed rules governing comparisons of weighted values generated with reference to prior profile entries which can be used to resolve whether the detected event-triggers corresponding to speech to text detections are accurately paired with what is happening at the time the speech to text recognition occurs.

Scoring Information

Scoring information is monitored for event-triggers to detect possible changes in the live-action event that may indicate an event-segment has occurred. In one embodiment, scoring information is monitored without recourse to the video feed itself. Rather, official scorekeepers for a sporting event typically input scoring values into a database that is accessible. When a scoring value changes, based upon the extent to which that change exceeds a predetermined threshold, that change is assigned a weighted value that can be used, in addition with other parameters and other weighted values, to determine if an event-segment occurred. In addition, the time of the scoring value change is recorded. The change to a particular score itself constitutes, in certain instances, an event-trigger. By way of an example, and without intending to limit the scope of the claims, the official scorekeeper's database indicates that the game's score changes from 0-1 to 0-2 at time 3:01 p.m. This is likely because a goal was scored a time within proximity of 3:01 p.m. In this way, the video-segment can be clipped with a predetermined number of seconds both before and after the time 3:01 p.m., and the scoring event will be captured by the video-segment. By way of another example, and without intending to limit the scope of the claims, if the official scorekeeper's record indicates that one of the teams recorded an error at 4:01 p.m., then it is presumptively likely that the video feed within a 10 or 20 second vicinity should be video segmented. By way of an alternate example, if the official scorekeeper's score indicates that a third strike has been recorded, then a video segment within the vicinity of that strike can be segmented. In this way, score changes, which depend on the sport or event being captured by the live-event video feed, and comprise, without limitation, runs, errors, hits, singles, doubles, triples, homeruns, strikes, balls, walks, fouls, points, touchdowns, field goals, safeties, tackles, interceptions, fumbles, sacks, punts, downs, goals, yellow cards, red cards, turnovers, penalty shots, baskets, three-point shots, foul shots, time-outs, and so forth. The breadth and variety of scores, figures and events that are recorded depends on the sport, the league, the type of event, and the foregoing is not intended to limit, in any way, the scope of scores, figures, records and events that are recorded and can act as event triggers. In an alternate embodiment, rather than accessing the database of an official scorekeeper for a given sporting event or other type of event, scores, figures and events acting as event triggers can be unofficial and generated by any means generally known in the art to do so. In an alternate embodiment, a single video feed capturing only the score-board can be monitored using frame-by-frame pattern recognition, or alternative means to monitor the score, to detect scoring information changes.

Scoreboard Information

In addition to scoring information, scoreboard information is monitored for event-triggers. Scoreboard information comprises information that marks the progression of a live-action event or a sporting event, and in addition to scoring information, scoreboard information typically appears on the scoreboard at the live-action event. In one embodiment, scoreboard information comprises time, and it is indicated on clocks that dictate the beginning, end as well as different stages of a given sporting event. By way of an example, and without intending to limit the claims, the clock in a basketball game is scoreboard information. In one embodiment, in a professional NBA basketball game, where each team has 24 seconds to shoot the ball before losing possession of the ball, the shot clock—which monitors this 24 second window—is monitored until it falls below a predetermined value, such as 3 seconds. Because basketball players typically scramble to make a play and/or shoot the ball before the shot clock expires, an event-segment may presumptively occur between 0 and 3 seconds on the shot clock. Similarly, the 45 second shot clock in college basketball is monitored as score-board information to detect if it falls below a pre-determined threshold. By way of another example, and without intending to limit the scope of the claims, the clock in a football game is monitored to determine when it is within a predetermined time before 2:00 minutes are left within the first or the second half. By way of an alternate example, and without intending to limit the claims, for any live-action event or sporting event that occurs within a specified period of time, and for which there is a clock, the clock is monitored until it falls below or within a predetermined time before the event or the game, or a section or portion of the game (i.e., the quarter, half, period, and so forth) expires. Presumptively, the time right before the expiration of a sporting event is likely to contain event-segments. By way of another example, and without intending to limit the claims, starts and stops of the clock are monitored. In alternative embodiments, non-clock parameters are monitored for event-triggers that might be indicative of an event-segment. By way of an example, and without intending to limit the claims, the beginning or end of an inning in a baseball game is monitored. In this way, scoreboard information, which includes, without limitation, timing and other related information indicating the progression of a live-action or sporting event is monitored for event-triggers. Different scoreboard information that constitute event-triggers, such as 2 seconds remaining on the shot clock in a basketball game, are assigned values that correspond to a weighting. This weighted parameter is input along with additional weighted parameters, described in more detail herein, to determine if an event-segment has occurred.

External Metadata

External metadata is monitored for event-triggers. External metadata constitutes information regarding a live-action event, such as a sporting event, that can reflect the likelihood of an event-trigger, which is not scoring information or scoreboard information. For any live-action event, a host of facts, figures, statistics and changes can be monitored that are not scoring information and do not typically appear on a scoreboard. External metadata therefore comprises information, including, without limitation, facts, figures, statistics and changes in a live-action event that indicate that something, like an event-segment, is happening. By way of an example, and without intending to limit the scope of the claims, during a professional football game, when one team chooses to punt the ball, the hang-time of the ball—i.e., the time for which the ball is in the air—is a fact that can be monitored. A detector that detects a punted ball's hang-time to exceed a predetermined threshold can, according to certain user preferences, constitute an event-trigger.

Turning back to FIG. 3 in STEP 304, it is determined whether the plurality of one or more event-triggers indicate that an event-segment has occurred. To determine whether an event-segment has occurred, the event-triggers are algorithmically compared. In one embodiment, each of the event-triggers are assigned weighted values that correspond to the weight that should be given to each detected event-trigger. In alternate embodiments, each respective detector that is monitoring for an event-trigger is also assigned a weight, which either alone or in combination with the weights assigned to each respective event-trigger, correspond to how event-triggers from different detectors should be weighed relative to each other. Put another way, each event-trigger is assigned a predetermined weight that corresponds to the weight of the detector that detected that event trigger relative to the detectors that detected additional event-triggers. By way of an example, and without intending to limit the scope of the claims, an audio detector located at a baseball stadium to monitor changes in the decibel level of the crowd may be assigned less weight then a physical sensor that indicates a batter swinging a bat. This is because a batter swinging at a pitch is most likely, though not definitively, a more reliable indication that an event-segment has occurred than a rise in the crowd's volume. This is because large-stadium baseball crowds typically afford fluctuating decibel levels that are not necessarily directly tied to events transpiring in the game. In an alternate embodiment, an event-trigger is weighted based upon how likely it is that that event-trigger corresponds to an event-segment. This weight is assigned independent of any other detectors. Rather, by way of an example, and without intending to limit the scope of the claims, a frame-by-frame pattern recognition detector for a soccer game that registers a sharp change in the frequency distribution of the color green in the video feed during a short period of time is given more weight than a small change in the frequency distribution of the color green over a longer period of time, presuming that in both instances, the frequency distribution was high enough to exceed a predetermined threshold and thereby constitute an event-trigger. The shorter, sharper frequency distribution change more likely indicates a shot on goal, whereas the gradual frequency distribution change may only indicate a kick down the field. In still another embodiment, event-triggers are assigned weighted values based on a combination of the foregoing two means to assign weighted values.

The respective weightings that are assigned to event-triggers and to different detectors are algorithmically compared to determine whether an event-segment has occurred. In one embodiment, each of the weighted values are added and/or operated upon in conjunction to determine whether the result exceeds a predetermined threshold. In an alternate embodiment, the weighted values are added and/or operated upon in conjunction to determine whether the result falls within a predetermined range of values. In these embodiments, operation performed upon the weighted values in conjunction can include, without limitation, by way of an example and without intending to limit the scope of the claims, any form of algebraic or other operations, including, but not limited to, addition, subtraction, multiplication, division, conditional operations, on/off operations, where a weighted value or the result of an operation either equals a predetermined value or not. In an alternate embodiment, the weighted values are added and/or operated upon in conjunction to determine whether the result is greater than or equal to, or in the alternative, less than or equal to, a predetermined value. In alternate embodiments, one or more of the following operations are performed upon the one or more of the weighted values to calculate a result that is then used, subsequently, along with additional results to calculate further results corresponding to a predetermined threshold.

Each time a detector registers an event-trigger, the time of the event trigger is recorded. In one embodiment, for each detector that registers an event-trigger at the same exact time, only the weighted values assigned to each of those detected event-triggers are algorithmically compared, and only using those event-triggers, it is determined whether an event-segment has occurred. In an alternative embodiment, for each detector that registers an event-trigger within a predetermined range of time, each of the assigned weighted values corresponding to the event-triggers within that range of time are compared. This is because different detectors may detect event-triggers corresponding to the same event-segment, but at different times. By way of an example, and without intending to limit the scope of the claims, a radar gun detecting a batter's swing may detect the speed of the swing before an audio detector detects an increase in the crowd noise, which occurs before the scoreboard indicates "STRIKE 1". Because each of the foregoing three detections constitute three different event-triggers that nevertheless correspond to the same event-segment, i.e., a batter swinging and missing, but because all three event-triggers occurred within a predetermined range of time, all three event-triggers are weighted and algorithmically compared to determine if an event-segment occurred.

Figure 5:
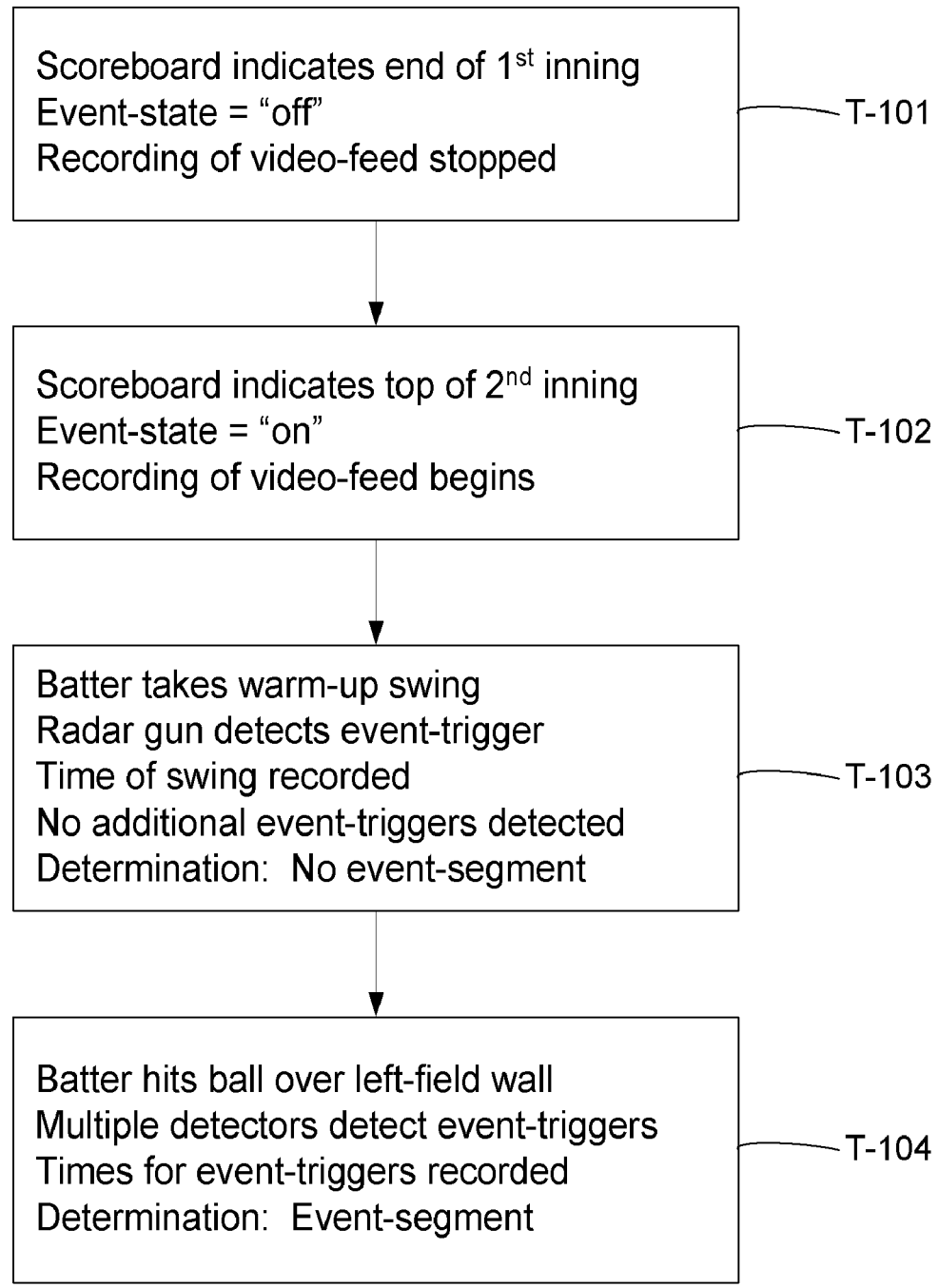
FIG. 5 is a flowchart illustrating one-embodiment of the disclosed method of video-segmentation.

FIG. 5 is a flowchart illustrating an exemplary example of video-segmentation. This example is directed to video-segmenting an event-segment during a live broadcast of a baseball game. Initially, before video-segmentation occurs, live video-content of the baseball game is captured by a camera, and the video feed is input into the ORB Box, as previously described, or into a server that performs pre-encoding and then transmits the video feed to the Cluster, or into another server for the purpose of performing video-segmentation. As discussed above, whether or not to bifurcate pre-encoding and video-segmentation among two or more distinct processors, servers, clusters or grids is a design-decision to account for each user's available processing power and storage capacity.

FIG. 5 is an example of a single video feed. At time T 101, the event-state is monitored via the scoreboard, which indicates that it is the end of the first inning and that the game is not currently in-play. The event-state is therefore indicated to be "off", and recording of the video feed, which is most likely airing a commercial break, is stopped. At time T 102, the scoreboard indicates that it is the top of the second inning, and accordingly, the event-state changes to "on". Recording of the video feed then begins.

At time T 103, the batter takes a warm-up batting swing. A radar gun located at the baseball stadium measures the speed of the warm-up swing. Initially, a predetermined threshold velocity is determined. This threshold is assigned is heuristic, empirical or estimated. In this example, the threshold velocity was determined based on the likelihood that a swing above a given speed corresponds to a swing at pitch. Sometimes, batters in a baseball game taking a warm-up swing will not swing the bat too quickly. At times this is due to a physical weight attached to the end of the bat that slows the swing's velocity. Other times, batters swing the bat very quickly during a warm-up swing. Most often, batters swinging at an actual pitch during the game swing the bat very quickly, and less often do they swing it slowly. Thus, the predetermined threshold velocity is determined to be a velocity that exceeds what is normally considered to be a "slow" warm-up swing at bat. The radar gun measures the batter's swing at time T 103 and determines that it exceeds a predetermined threshold velocity. The time that the radar gun detects the warm-up swing is recorded as T 103, and the warm-up swing is registered as an event-trigger. No other detectors detect an event trigger. The frame-by-frame pattern recognition is monitoring pixel-color changes within the vicinity of the strike-zone. Because the batter has taken a warm-up swing before stepping up to the plate, these swings are not detected. The audio detectors do not detect a significant rise in the decibel level of the crowd. The scoring information, the scoreboard information and the external metadata do not change. A value is assigned to the radar gun's detection of the warm-up swing. In this example, the value corresponds to a number of different factors. First, this value corresponds to the extent to which the warm-up swing's velocity exceeded the predetermined threshold velocity. In this example, the value is normalized and assigned a weight that is directly proportional to the extent to which the warm-up swing's measured velocity exceeded the predetermined threshold velocity. In this example, the value is additionally weighted by the relative importance initially assigned to the radar gun's detections with respect to the other detectors in use (frame-by-frame pattern recognition, audio detectors, scoring information, scoreboard information, and external metadata for the purpose of determining if an event-segment occurred. In this example, frame-by-frame pattern recognition is assigned the greatest weight compared to the other detectors, followed by scoring information and scoreboard information, which are equally weighted, followed by the radar gun, followed by the other detectors. Finally, the value is additionally weighted by a factor that reduces its weight in the event that a radar gun affirmatively detects an event trigger, but neither the scoring information detector nor the scoreboard information detector affirmatively detect an event trigger.

The weighted value assigned to the radar gun's detected event-trigger is then algorithmically compared to the other weighted values that correspond to other detected event triggers. In this example, any additional event-triggers that occurred within a predetermined three-second vicinity of T-103 (i.e., three seconds before T-103 and three seconds after T-103) are compared with the radar gun's event-trigger value. In this example, it is initially determined that if a radar gun detects an event trigger, all other detected event triggers will be compared to each other provided they fall within the six-second window straddling the radar guns' event trigger. Because there was only a single event-trigger within a three-second vicinity of T-103, as well as for other reasons with respect to the specific weighting of an event-trigger detected by a radar gun in the absence of any scoring information or scoreboard information event-triggers, it is determined that an event-segment has not occurred. Recording of the live video feed continues. None of the recorded video is trimmed and appended with metadata to produce a video-segment.

The batter then steps up to the plate, the pitcher and the catcher exchange signals, and the pitcher then winds up and delivers a pitch. At time T-104, the batter swings the bat and hits the ball, which travels over the outfield and then over the left-field wall. Frame-by-frame pattern recognition detects the batter's swing within the strike zone, and it records the time of the swing. Frame-by-frame pattern recognition also detects a marked increase in the pixel-color frequency distribution of a predetermined selection of colors heuristically determined to correspond to an image comprising fans in the stands. The time of this detection is also recorded. A radar gun detects the speed of the swinging bat, and the time of the swinging bat is recorded. Audio detectors detect a marked increase in the decibel level of the crowd, and the time at which the rate of increase of the decibel level is highest is recorded. Scoring information indicates that a run has scored, and the time the score changes is recorded.

In this example, the time that is recorded for each registered event trigger is predetermined. For instance, frame-by-frame pattern recognition records the time when the rate of change of the pixel-color frequency distribution is the fastest. Alternatively, the time recorded by a frame-by-frame pattern recognition event trigger could be the time the frequency distribution begins to change. In still alternative embodiments, it is a design-decision what time to record as the time of the change in pixel-color frequency distribution. In some embodiments, the times for event-triggers, such as a radar gun detecting a swinging bat, default for the times of other event-triggers, such as a changing pixel-color frequency distribution. Because video-segments are trimmed with extra seconds before and after the event-segment, pinpointing the exact moment the event-segment occurs is not typically necessary. In alternate embodiments, the median time for a plurality of times corresponding to event-triggers all falling within a predetermined range of time is a means for determining the time of the event-trigger for the purpose of determining the number of seconds to add both before and after the event-trigger to trim the video feed into a video-segment.

The event triggers detected by each of the foregoing detectors, including the frame-by-frame pattern recognition, the radar gun, the audio detector, the scoring information and the scoreboard information are heuristically assigned weighted values. In this example, each weighted value accounts for a number of factors including, the extent to which each measured detection exceeded a predetermined threshold, when applicable, (for instance, scoring information is not detected on the basis of the change in score exceeding a predetermined threshold). Also, the relative weight of each of the sensors with respect to one another is accounted for. Also, a weighting factor that accounts for how much weight to give certain detectors when other detectors detect an event-trigger. For instance, in this example, the radar gun's detection is more heavily weighted than the example at time T-103 because scoring information also detected an event-trigger, which is an indication that the batter's swing amounted to a change in the score, and possibly a homerun or an RBI, which is most likely an event-segment that viewers will wish to see again. The collection of weighted values assigned to the detected event-triggers are then algorithmically compared, and it is determined that an event-segment did in fact occur.

It will be appreciated by those skilled in the art that different live-action events contain different event-segments, and accordingly, require different event-triggers. In addition, different live-action events require that detectors measure different values, and predetermined threshold determinations will differ with respect to determining if event-segments—specific to each live-action event—actually occurred. Accordingly, different live-action events contain different event-segments that can be detected using a variety of algorithms that input values assigned to the event-triggers that can be preprogrammed and tailored by the user to meet the demands of the live-action event that is being monitored. Weightings determinations between respective detectors, as well as assignment of respective weights, are likewise different for different live-action events, and each corresponding algorithm.

Turning back to FIG. 3, if it is determined in STEP 304 that an event-segment has occurred, then in STEP 305, it is determined where to clip the beginning and end of the video-clip so that it includes the event-segment. In one embodiment, event-triggers are used to determine how long the event-segment should be. By way of an example, and without intending to limit the scope of the claim, the scoreboard indicates that a strike occurred, a physical sensor indicates that the batter swung, and frame-by-frame pattern recognition does not indicate that a pre-selected pixel color's frequency distribution did not exceed a predetermined level (thereby indicating that the batter did not hit a foul ball, but swung and missed the ball). Typically, baseball viewers interested in downloading a batter swing and miss a ball will only be interested in viewing a few seconds before the swing and only one or two seconds after the swing. Accordingly, using detectors, including the scoreboard-information indicating a strike has occurred, the recorded live video feed is trimmed to produce a video-segment that commences five seconds before the swing (or one of the recorded times registered by one of the detectors registering the swing as the event-trigger) and two seconds after the swing. The number of seconds that the live video feed is trimmed both before and after the event-trigger time is a design decision that can be altered by the user depending on the live-action event. By way of another example, and without intending to limit the scope of the claims, the scoreboard indicates that a run is scored, the frame-by-frame pattern recognition indicates an increase in pixel-color distribution at a level that has been heuristically determined to indicate that the camera is panning over the crowd, and the audio detectors measure a decibel level among the crowd increase that greatly exceeds a predetermined threshold. Typically, baseball viewers interested watching the high-light of a homerun prefer it to begin shortly before the batter hit the ball, to include the wind-up and delivery of the pitch by the pitcher, and to end shortly after the ball lands in the stands, so that viewers can watch fans scramble to pick up the ball. Accordingly, using detectors, including scoreboard-information indicating that a run has scored, or scoring information indicating that a homerun has occurred, the recorded live video feed is trimmed to produce a video-segment that begins five seconds before the swing and ends forty seconds after the swing. In this example, the swing is used as the event-trigger that records a time from which both the beginning and end of the video-segment are measured. Alternatively, the decibel increase among the crowd, or some other event trigger, could be the measuring point for the event-segment, in which case the length of time trimmed before and after that respective event-trigger will likely be different.

It will be appreciated by those skilled in the art that in an alternative embodiment, additional inputs can heuristically guide the determination of when to trim the live video feed to begin and end the event-segment so that it becomes more consistent with the user's preferences over time. In this embodiment, therefore, a manual operator can manually override the beginning and end time determined for a given video-segment. By way of an example, and without intending to limit the scope of the claims, a heuristically developed algorithm trims the video-feed of a homerun to commence five seconds before the batter's swing and to end 30 seconds after the batter's swing. A manual operator command is received that overrides those beginning and end parameters for the video-segment so that it ends 40 seconds after the swing because 30 seconds failed to capture the fans scrambling for the ball in the stands. Going forward, in the event that an event-segment is being trimmed for a homerun, the determination for when to begin and end an event segment will be consistent with the prior manual override. In one embodiment, a calculation is made of the difference between what was initially calculated (30 seconds from event-trigger until end of video-segment) and the resulting video-segment with manual override (40 seconds). In this example, the difference is 10 seconds. Going forward, 10 seconds are added to any calculation for a homerun for the time determined from the event-trigger until the end of the video-segment. For additional received manual overrides for the same event-segments, the average difference over multiple over-rides is calculated and added or subtracted from the initial algorithmically determined time. In this example, an additional override for a homerun that adds 8 seconds will, subsequently, for the third homerun, add 9 seconds, provided there is no received manual over-ride for the third homerun. In this way, a system and/or process suitable as an embodiment of the present disclosure can effectively learn how to best trim the video-segments to align with user-preferences for different event-triggers, different event-segments, and different live-action events.

Turning back to FIG. 3, in one embodiment, in STEP 306, the recorded video is clipped according to the determinations in STEP 305, and in STEP 307, information is added to the trimmed video-clip, and the resultant product is a video-segment. The added information comprises information that live-action spectators, such as fans, prefer to know about an event-segment. By way of an example, and without intending to limit the scope of the claims, a clip showing a homerun in a baseball game includes metadata comprising, without limitation, one or more of the following: a description of the event segment (such as "Homerun"), the batter's name, the game's score, the inning, the number of outs, the batter's batting average, and so forth.

Turning back to FIG. 1, in one embodiment, in STEP 108, menus are transmitted to registered devices. Initially, at some point, devices registered to receive video-segments according to an end-user's preferences are determined, which is described in more detail below. By way of an example, and without intending to limit the scope of the claims, an end-user initially register's a device to receive menus displaying available video-segments pursuant to a set of pre-selected preferences. By way of an example, and without intending to limit the scope of the claims, an end-user registers a device to receive menus displaying available video-segments from all baseball games on a given Saturday. Upon reception that a specific baseball game included on the transmitted menu has been selected, another menu is transmitted to the registered device showing all available video-segments for that specific baseball game.

Figure 6:
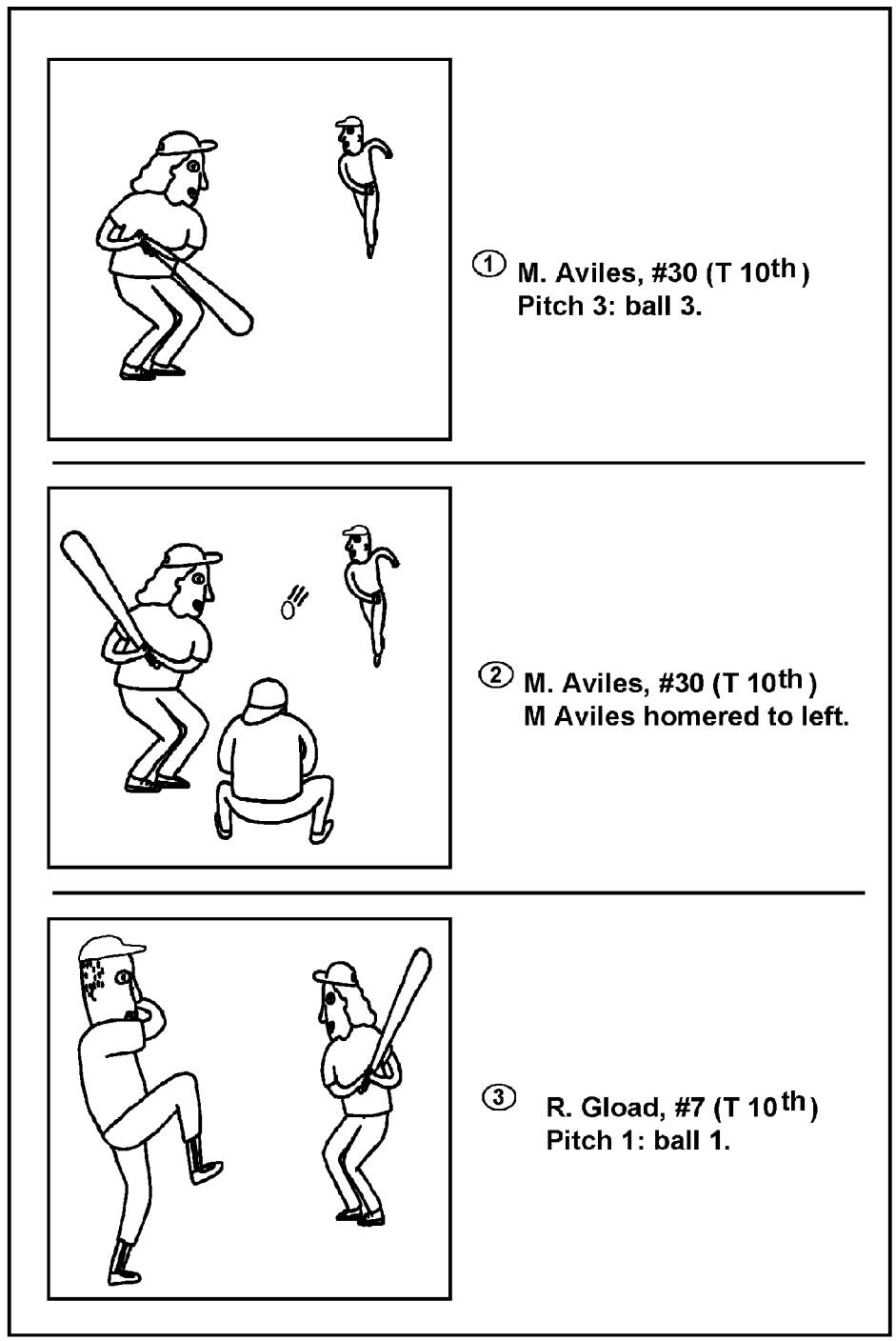
FIG. 6 is a snapshot of one embodiment of a menu displaying available video-segments.

FIG. 6 is an illustrative example of a menu transmitted to a registered device that shows available video-segments, along with attendant information, displayed on a registered device for a specific baseball game. In this example, the video-segments are listed from the top as the event-segments occurred chronologically during the game. The menu contains information that video-segment number 1 corresponds to the batter, M. Aviles, who wears the number 30 for his respective team, it is the top of the 10th inning, and the event-segment is that there was a ball thrown for the M. Aviles' third pitch at bat. Turning to number 4, the menu contains information that indicates that in video-segment number 2, M. Aviles hit a homerun to left-field. Finally, the menu indicates that video-segment number 3 is a video-clip of the event-segment wherein R. Gload, who wears number 7, received a ball on his first pitch. Additional embodiments with respect to the menu containing available video-segments is described in more detail below.

In one embodiment, the information describing the event-segment that appears on the menu in FIG. 6, and in some embodiments, is added to the video-feed to comprise the clipped video-segment, is generated as a function of the detected event-triggers. By way of an example, and without intending to limit the scope of the claims, referring to FIG. 6, in video-segment number 2, the textual data indicates that the video-segment contains a clip showing M. Aviles hitting a homerun to left-field. In this example, this event-segment was determined based, in part, upon detections of scoring information that indicated that the score had changed, as well as changes in scoring information indicating that one run had been scored for M. Aviles' team. The event-segment was also determined in part by other detected event-triggers, including external metadata that indicated that M. Aviles was still at bat, and a pitch was thrown, and no runners were on base, as well as other event-triggers that indicated that the period of time after M. Aviles swung his bat and before the scoring information changed was below a predetermined threshold. Together, that information was input into a function yielding the conclusion that M. Aviles hit a homerun. Additional event-triggers could have yielded detections that aided in this determination, including frame-by-frame pattern recognition of the number worn by the player at bat, which corresponds within a predetermined database to the number worn by M. Aviles. Accordingly, in a similar manner described above regarding detected event-triggers assigned weighted values and algorithmically compared to determine if and when an event-segment occurred, event-triggers can be input into functions that can narrow down the likelihood that what occurred—what the actual event-segment was—is only one among a database of predetermined possibilities. In this example, the time before the recorded time of a radar gun detecting the swinging of a bat and the recorded time of the scoring information changing, and the detection of external metadata indicating that no runners were on base, yielded the single conclusion that a homerun was likely hit, and this determination corresponds to a predetermined word, phrase or other form of textual data, which in this case is "homered". Similar determinations conclude that it was M. Aviles who hit the homerun, and that the homerun was hit to left-field. In this way, the event-triggers, along with the determination that event-segments occurred, can functionally correspond to textual data describing the event-segment that can be added to the event-segment to constitute the video-segment and be displayed in the menu to describe what event-segment is contained in the video-segment.

Turning back to FIG. 1, in STEP 106, the video-segment is transcoded. In this step, the video-segment is transcoded to a plurality of video/audio encodings compatible with the spectrum of different cellular telephone and personal computer operating system formats. Typically, different cellular telephone carriers deploy different and incompatible encoding regimes. In addition, different cellular telephone devices support different encoding regimes. Video-segments are therefore transcoded to a plurality of encodings to permit their transmission over a plurality of carriers to a plurality of mobile devices. Similarly, video-segments are transcoded for support by a plurality of protocols and encodings to personal computers over the internet. In alternate embodiments, transcoding comprises one of more of the following: changing a signal, such as a digital bitstream, for the purpose of, without limitation, compression, encryption or translation from one code to another, re-coding, and transcoding both lossy and lossless data. Transcoding as used herein is generally well-known by those skilled in the art, and the foregoing list is not intended to comprise an exhaustive list of all transcoding operations, nor by virtue of being listed here, is the foregoing list intended to limit the scope of the claims. In an alternate embodiment, the pre-encoded or not pre-encoded event-segment is already encoded to be compatible with a single cellular telephone carrier or registered device, and in this embodiment, encoding is unnecessary. In an alternate embodiment, the video-feed is transcoded to a plurality of encodings before event-segments are recorded and/or before event-segments are trimmed into video-segments.

Turning back to FIG. 1, in STEP 107, an end-user's device is appraised for different parameters for the purpose of determining the optimal means for transmitting menus of available video-segments as well as video-segments. Initially, an end-user's device is registered for the purpose of receiving video-segments. End-user devices capable of receiving audio/video content are widely known by those skilled in the art. These can include, without limitation, cellular telephones and/or personal computers. In one embodiment, an end-user receives video-segment via connection with the internet. In an alternate embodiment, an end-user receives a video-segment on a mobile device via Short-Message-Service (SMS) alert text message or a Multimedia-Messaging-Service (MMS) message from a Short-Message-Peer-to-Peer (SMPP) server. In an alternate embodiment, an end-user receives a video-segment on a mobile device via Wireless Application Protocol (WAP) server. In alternate embodiments, additional devices and means for receiving audio/video content well-known by those skilled in the art is used for the end-user to receive video-segments.

Appraisal of an end-user's device that has been registered to receive video-segments includes determining one or more parameters of the device, which include, without limitation, and by way of an example and without intending to limit the scope of the claims, the device's make and model, the device's carrier system, wireless mode and so forth. Following appraisal of these parameters, the optimal encoding and transmission parameters are chosen, including, without limitation, the optimal frame-rate, resolute, data size, video codec, audio codec. Following this determination, requested video-segments and menu-pages are transmitted to the end-user's registered device.

Turning back to FIG. 6, an illustrative snapshot of a screen on cellular telephone or personal computer belonging to an end-user whose device is registered to receive video-segments. Initially, in one embodiment, an end-user's preferences to access video-segments corresponding to categories of pre-selected event-segments will have been registered. By way of an example, and without intending to limit the scope of the claims, an end-user's preference to access all video-segments for Saturday's baseball game between the Philadelphia Phillies and the New York Mets will be registered, and only video-segments satisfying that criteria, i.e., from that game, will be transmitted to that end-user's device. Alternatively, in addition to preferences to view select games, an end-user's preferences to access only video-segments for certain sports, players, musicians and so forth can be initially selected. By way of another example, and without intending to limit the scope of the claims, only video-segments from a specific game where a player hits a homerun can be provided to an end-user's device. In alternate embodiments, the textual data that is generated in connection with the determination if and when an event-segment occurred is catalogued in database that enables end-users to submit search requests, for those search requests to be received, and for a search program and/or video or textual filtering algorithms well-known by those skilled in the art to display all video-segments corresponding to the end-user's inputted search criteria.

In this embodiment, an end-user's mobile device, such as a cellular telephone, contains a WAP browser. The WAP browser enables the end-user to access a menu-page, shown in FIG. 6. An image corresponding to an event-segment is shown along with metadata describing the event-segment. Clicking or enabling the pictured event-segments thus prompts the cellular telephone or personal computer to display the video-segment corresponding to the event segment. In one embodiment, the most recent event-segments are at the top of the list, and by scrolling down, the end-user scrolls down to access event-segments that occurred earlier in time. In alternative embodiments, event-segments can be arranged according to different criteria. By way of an example, and without intending to limit the scope of the claims, event-segments can be arranged to show all home-runs first, followed by all strike-outs, followed by other pre-selected preferences for specific event-segments. Alternatively, all event-segments corresponding to a specific player or musician or song or race-car can be displayed first. In alternate embodiments, different camera views of the same event-segment can be displayed on the end-user's device for selection either before or after an end-user selects to display a particular event-segment. By way of an example, and without intending to limit the scope of the claims, an end-user's WAP-enabled device prompts an end-user to select an event-segment. Turning back to FIG. 6, the end-user selects the second video-segment, in which the information indicates that "M Aviles homered to left." Following this selection, the end-user's device is prompted to select from a plurality of camera views that captured the homerun hit by M Aviles at the same time. Initially, the video-feed will comprise a plurality of camera-feeds capturing video-content of the baseball game from different angles and/or perspectives. Although only one camera angle may be shown on television at one time, as broadcast by the particular television network and/or station broadcasting the baseball game, the end-user's device is enabled to select from a plurality of video-feeds capturing the same homerun.

In an alternate embodiment, multiple video-segments are edited together to form another video-segment or video clip that comprises a series of individual video-segments. By way of example, and without intending to limit the scope of the claims, a series of video-segments that were created from a single baseball game can be edited together to form a video-segment that comprises a mini-game. In this example, the mini-game will effectively comprise the game's highlights edited together chronologically so that a user viewing the mini-game can appreciate the overall narrative of that particular game by viewing its highlights alone via the mini-game. In another example, a video-segment comprising the highlights from a musical concert is edited together to form a longer video-segment. In an alternate embodiment, rather than chronologically editing together all the highlights from a particular sporting event, only specific types of highlights are edited together. By way of example, and without intending to limit the scope of the claims, a mini-game is created by editing together all video-segments that comprise goals from a particular soccer game. In another example, a mini-game is created by editing together all video-segments that comprise the goals scored by only one of the teams from a particular soccer game. In another example, a mini-game is created by editing together video-segments that only comprise goals scored by a particular player from a particular soccer game.

In an alternate embodiment, multiple video-segments are edited together to form another video-segment that does not necessarily summarize the narrative of a particular game or live-action event, but comprises a highlight reel or highlight clip of a specific player, or some other criteria or metric. By way of example, and without intending to limit the scope of the claims, a highlight reel is created by editing together a series of video-segments of a specific baseball player hitting homeruns throughout his baseball career. In another example, a highlight reel is created by editing together a series of video-segments of a specific basketball player making a three-point shot, or rebounding the ball, or receiving a technical foul from a particular game, a particular season, a particular career, or some other predetermined range of activity. In another example, a highlight reel is created by editing together a series of video-segments comprising a particular musician singing his or her signature wail, screech, sound, guitar lick, drum solo and so forth. In another example, rather than creating a highlight reel with a specific sports figure or musician doing the same thing, a highlight reel can be created by editing together a series of video-segments that show different players doing different things. For example, if one player typically assists and another player typically scores, the highlight reel can be created by editing together a series of video segments of one player making assists and the other player scoring. Accordingly, highlight reels can be created by editing together a series of video-segments that satisfy any given criteria or metric designated as a design-decision by the user.

In an alternate embodiment, a highlight reel, or other series of edited together video-segments can be generated pursuant to a user's personalization filters. By way of example, and without intending to limit the scope of the claims, via a menu or other forum for a user to select its preferences, a user can select favorite play types, players, teams, musicians, politicians, or other type of subject matter, and the highlight reel can be automatically generated at a certain time to include all of or some of a series of video-segments corresponding to a user's pre-selected preferences and/or criteria. In one embodiment, the user's preferences can be explicit, as in the example of a user explicitly pre-selecting preferences from a menu of available preferences. In another embodiment, a highlight reel can be generated based upon implicit preferences. By way of example, and without intending to limit the scope of the claims, if a particular user frequently chooses generation of highlight reels involving a certain hockey player scoring goals, then a highlight reel can be generated with video-segments of the same hockey player making assists. In this way, though a highlight reel is not generated pursuant to the explicit pre-selected preferences of a particular user, rather the same user's prior behavior and prior explicit preferences are used to generate a highlight reel that the same user is likely to be interested in viewing based upon predictive algorithmic methods known to one of ordinary skill in the art. In an alternate embodiment, a user's previous explicit pre-selected preferences can generate a recommendation engine or other analogous recommendation mechanism that alters, modifies or changes the forum, such as the menu, for the user to make explicit pre-selected preferences for highlight reels to cater to a user's implicit preferences.

In one embodiment, the video-segments are edited together manually. In an alternate embodiment, the video-segments are edited together automatically. In one embodiment, every created video-segment from a particular live-action event is edited together to create a mini-game. By way of example, and without intending to limit the scope of the claim, each generated video-segment from a particular baseball game is edited together. In one embodiment, all generated video-segments from a live-action event are edited together chronologically. In an alternate embodiment, all video-segments are edited together pursuant to a different metric. In an alternate embodiment, the automatic generation of a mini-game is designed to satisfy a predetermined time-constraint. By way of example, and without intending to limit the scope of the claims, a mini-game for a particular baseball game is predetermined not to exceed six minutes. In this embodiment, for each instance of a video-segment being generated pursuant to the methods described within this specification, a weighted value is assigned to that particular video-segment, which reflects the relative importance of each event-segment. In one embodiment, more important events are assigned greater weighted values because they typically correspond to an event that users would be more interested in viewing. By way of example, and without intending to limit the scope of the claims, a grand-slam in a baseball game is assigned a greater weighted value than a one-run home run. In another example, a musician falling off the stage is assigned a greater weighted value than the same musician's guitar solo. In another embodiment, a politician making a joke during a speech and receiving laughter or excessive applause is assigned a greater weighted value than the same politician approaching the podium to make the same speech. In this embodiment, upon the automatic generation of the mini-game, or series of edited video-segments for a particular live-action event, in the event all of the video-segments generated from the particular live-action event exceed the pre-designated time, (e.g., six minutes), then video-segments with the lowest weighted values are automatically excluded from the mini-game. This process continues until the series of video-segments edited together to comprise the mini-game fall within the allotted pre-designated time period. According to this embodiment, the automatic generation of a mini-game, highlight reel or other series of edited together video-segments will meet a pre-designated time period constraint while simultaneously containing those video-segments that users are most interested in viewing. By way of an additional example, a highlight reel that is required not to exceed a predetermined time period can be automatically generated based upon predetermined weighting values assigned to each video-segment that satisfies the criteria for inclusion in the highlight reel, and only those video segments with the weighting values that are the greatest, least, or fall within a predetermined range, depending on the user-generated design, will be included in the highlight reel up until the allotted time for the highlight reel is met, and then the remainder of video-segments will be excluded from the highlight reel.

In an alternate embodiment, a mini-game, highlight reel, or other series of edited together video-segments, can also comprise additional audio/video data that does not comprise a video-segment generated pursuant to the methods described within this specification. By way of example, and without intending to limit the scope of the claims, advertisements can be edited into a mini-game between video-segments. Inclusion of advertisements in a mini-game can be automatically included. In one embodiment, advertisements from highest paying sponsors for the live-action event can be included before and/or after a video-segment containing the highest assigned weighted value, as described in the foregoing paragraph. In another embodiment, each time a particular event-segment occurs in a video-segment, such a homerun, an advertisement from a particular sponsor can be included before and/or after that particular video-segment. By way of example, and without intending to limit the scope of the claims, advertisements can be full-screen advertisements, sponsor insertions, such as a brand, trademark or logo, graphically imposed on top of a video-segment, or audio insertions between and/or during video-segments. In an alternate embodiment, graphical elements and other animated effects can be included within the mini-game. By way of example, and without intending to limit the scope of the claims, these can include video and/or audio fades, wipes and/or graphics and/or audio "swooshes", or similar video and/or audio effects and/or sounds commonly known to a person of ordinary skill in the art. In another example, video, audio and/or graphical transitions between video-segments can be used. In one embodiment, non-video-segment audio and/or video data, including, without limitation, graphical elements, are inserted between video-segments. By way of an example, and without intending to limit the scope of the claims, a "swoosh" sound is inserted in conjunction with or without additional video effects, such as a wipe that reveals a new video-segment after a prior video segment. Additional audio/video effects can be inserted in between or on top of video-segments in manner understood by a person of ordinary skill in the art.

In one embodiment, a predetermined mapping between certain event-segments and certain advertisers, advertisements or graphical elements can be pre-designated by the user. In this embodiment, in the event of the automatic inclusion of a particular video-segment, the advertisement or graphical elements corresponding to that particular event-segment will be included in the mini-game. In an alternate embodiment, certain graphical elements or advertisements can be mapped to pre-determined information by a user-design anticipated to be garnered from certain event-triggers, such as, for example, a particular player's name, a musician, a politician or other member of a particular live-action event, a player's scoring statistics, and in one example, in the event a video-segment includes that particular player, then the corresponding advertisement or graphical element is included in the mini-game. In an alternate embodiment, predetermined mappings between information garnered from certain event-triggers and graphical elements and/or predetermined mappings between certain event-segments and graphical elements can themselves be assigned pre-designated weighted values that resolve competing instructions upon the automatic generation of a mini-game to include different graphical elements for the same video-segment. In this way, the pre-designated weighted values assigned to the mappings reflect the relative importance of displaying two or more competing advertisements, graphical elements, or non-video-segment audio/video data that are each mapped to the same event-segment or event trigger, and thus the relative importance of two or more competing mappings. By way of example, and without intending to limit the scope of the claims, if a one-run homerun is mapped to the graphical element of a cartoon bat hitting a cartoon baseball, and a particular player, Derek Jeter, is mapped to the graphical element that reads, "Mr. November", then each of these mappings is assigned a weighted value, 0.8 and 0.9 respectively. In this example, if Derek Jeter hits a one-run homerun, then the automatic generation of the mini-game would resolve to display the graphical element for the "Mr. November" because it has the greater weighted value. and the graphical element of a cartoon bat hitting a cartoon baseball is excluded from the mini-game. In this way, additional rules and instructions for the automatic generation of a mini-game can be pre-designated by a user to correspond to the automatic inclusion of the graphical elements or advertisements that users preferably would want to see. In an alternate embodiment, a mini-game, highlight reel, or other series of video-segments can be automatically generated to include advertisements, graphical elements, or other non-video-segment video data along with the video segments satisfying criteria for inclusion in the mini-game, highlight reel, or other series of video-segments, while also automatically being generated not to exceed a certain pre-determined period of time based comparisons of assigned weightings values to each video segment. Highlight reels and mini-games can be manually and/or automatically generated or in combinations thereof, automatically transcoded into one or more video formats, and distributed to various platforms including but not limited to content management systems, mobile devices, connected TV devices, and in other contexts.

It will be appreciated by persons skilled in the art that the present disclosure is not limited to what has been particularly shown and described herein. Rather, the scope of the present disclosure is defined by the claims which follow. It should further be understood that the above description is only representative of illustrative examples of implementations suitable for use with the invention.

What is claimed is:

1. A method for creating a video-segment from one or more video-feeds of a live-action event, comprising:
    monitoring a live-action event for event-segments, wherein the detection of an event-segment includes the steps of
        detecting one or more event-triggers with detectors within a predetermined time range, wherein at least one of the detectors comprises a speech-to-text recognition detector that detects as an event-trigger information regarding what is occurring in the live-action event,
        receiving external metadata from a source other than the video-feeds and their accompanying information, and
        automatically determining when an event-segment occurs by entering said event-triggers and the metadata into a predetermined profile; and
    automatically editing said one or more video-feeds into a continuous video that encompasses a plurality of event-segments and that does not exceed a maximum time length, and wherein when the inclusion of all detected event segments in said video-segment would exceed said maximum time length, prioritizing inclusion of said event-segments according to their importance so that said maximum time length is not exceeded.

2. The method of claim 1, further comprising
    determining if the event-state is "on" or "off";
    recording one or more of the one or more video-feeds if the event-state is determined to be "on".

3. The method of claim 1, wherein at least one of the detectors comprises a frame-by-frame pattern recognition detector.

4. The method of claim 1, wherein at least one of the detectors comprise a physical sensor detectors.

5. The method of claim 1, wherein at least one of the detectors comprises an audio recognition detector.

6. The method of claim 1, wherein the live-action event is a sporting event, and the external metadata is scoring information.

7. The method of claim 1, wherein the live-action event is a sporting event, and the external metadata is scoreboard information.

8. The method of claim 1,
    wherein when said event-triggers include a speech-to-text event-trigger that indicates a contrary conclusion to another event-trigger, applying a weighing factor to the speech-to-text event-trigger that is inversely proportional to the temporal differential between when the speech-to-text event trigger and the other event-triggers were registered.

9. The method of claim 8, wherein said speech-to-text recognition detector automatically detects as an event-trigger persons participating in the live-action event.

10. The method of claim 8, wherein said speech-to-text recognition detector automatically detects as an event-trigger statistical information related to what is occurring in the live-action event.

11. A method for delivering a plurality of video-segments from one or more video-feeds of a live-action event to a user device, comprising:
    monitoring a live-action event for detection of event-triggers;
    creating a plurality of event-segments, each event-segment created by the steps of:
        detecting one or more event-triggers with detectors, wherein at least one of the detectors comprises a speech-to-text recognition detector that detects as an event-trigger information regarding what is occurring in the live-action event;
        automatically determining if an important event occurred based on the detected event-triggers;
        automatically editing said one or more video-feeds into an event-segment to encompass the important event;
        wherein each detected event-trigger is assigned a weighted value based upon the detected event trigger;
    editing a plurality of event-segments into a continuous video that does not exceed a maximum time length, wherein when the inclusion of all detected event-segments in said video would exceed said maximum time length, prioritizing inclusion of said event-segments according to their importance so that said maximum time length is not exceeded; and
    presenting on said user device a selectable representation of said video.

12. The method of claim 11, wherein the weighted value assigned to each event trigger is based upon the detected event trigger exceeding a predetermined threshold.

13. The method of claim 12, wherein the weighted value assigned to each event trigger is proportional to the extent to which the detected event trigger exceeded said predetermined threshold.

14. The method of claim 11, wherein the weighted value assigned to each event trigger is based upon each detector's predetermined relative importance to each other detector.

15. The method of claim 11, wherein the weighted value assigned to each event trigger is based upon each detector's predetermined relative importance to each other detector that also detects an event trigger within a predetermined range of time.

16. The method of claim 11, wherein the weighted value assigned to each event trigger is based upon each detected event trigger's predetermined relative importance to each other event trigger.

17. The method of claim 11, further comprising:
Wherein it is determined if an important event occurred based on an algorithm that is specific to the live action event.

18. The method of claim 11, wherein said algorithm is based upon the result of an operation, acted on one or more of the weighted values, being less than a predetermined value.

19. The method of claim 11, wherein said algorithm is based upon the result of an operation, acted on one or more of the weighted values, falling with a range of predetermined values.

20. The method of claim 11, wherein said algorithm is based upon the result of an operation, acted on one or more of the weighted values, being greater than a predetermined value.

21. The method of claim 11, further comprising:
recording the time that each event-trigger is detected;
determining when the important event occurred based on the recorded times of each detected event trigger.

22. The method of claim 21, wherein it is determined when the important event occurred based upon the recorded times of each event trigger that all fall within a predetermined range of time.

23. The method of claim 22, wherein one or more video feeds are edited into an event-segment to encompass the important event based on when it is determined that the important event occurred.

24. The method of claim 21, wherein one or more video feeds are edited into a video-segment to encompass the important event based on the event triggers used to determine whether the important event occurred.

25. A method for creating a mini-event from one or more video-feeds of a live-action sporting event, comprising:
monitoring the live-action event for detection of event-segments, wherein the detection of an event-segment includes the steps of;
detecting one or more event-triggers with detectors, wherein at least one of the detectors comprises a speech-to-text recognition detector that detects as an event-trigger information regarding what is occurring in the live-action event;
automatically determining if event-segment occurred based on the detected event-triggers by entering them into a predetermined profile;
automatically editing said one or more video-feeds into a video-segment to encompass said event-segment: and
automatically editing a plurality of video-segments into a continuous video mini-event that is shorter in duration than the live-action sporting event, that satisfys at least one criteria and does not exceed a maximum time length, wherein when inclusion of all detected video-segments would exceed said maximum time length, prioritizing inclusion of said video-segments according to their importance so that said maximum time length is not exceeded.

26. The method of claim 25, wherein the plurality of video-segments are edited together chronologically, and wherein only a subset of the video-segments are included in the mini-event.

27. The method of claim 25, wherein the plurality of video-segments each satisfy a pre-determined criteria explicitly designated by a user.

28. The method of claim 26, wherein the live action event is a sporting event and the criteria is events related to at least one particular player.

29. The method of claim 26, wherein the plurality of video-segments each satisfy a pre-determined criteria determined without user input based upon a user's prior explicit behavior.

30. The method of claim 25, further comprising:
automatically editing together video-segments with video data that does not comprise a video segment.

31. The method of claim 30, further comprising,
wherein inclusion of non-video-segment video data with a series of video-segments is automatically determined based upon pre-determined mappings between certain important events and certain non-video-segment video data.

32. The method of claim 30, further comprising,
wherein inclusion of non-video-segment video data with a series of video-segments is automatically determined based upon pre-determined mappings between certain information garnered from detected event-triggers and certain non-video-segment video data.

33. The method of claim 31, further comprising:
automatically determining exclusion of certain non-video-segment video data in the series of video-segments based upon a pre-determined relative importance of assigned to the mappings.

34. The method of claim 25, further comprising:
automatically editing together video-segments with audio data that does not comprise a video segment.

35. The method of claim 34, further comprising,
wherein inclusion of non-video-segment video data with a series of video-segments is automatically determined based upon by pre-determined mappings between certain important events and certain non-video-segment audio data.

36. The method of claim 34, further comprising,
wherein inclusion of non-video-segment video data with a series of video-segments is automatically determined based upon by pre-determined mappings between certain information garnered from detected event-triggers and certain non-video-segment audio data.

37. The method of claim 35, further comprising:
automatically determining exclusion of certain non-video-segment audio data in the series of video-segments based upon a pre-determined relative importance assigned to the mappings.

38. The method of claim 25, further comprising:
editing a plurality of video-segments into another video-segment that will not exceed a predetermined time period.

39. The method of claim 38, further comprising:
automatically determining exclusion of certain video-segments into the series of video- segments based upon a pre-determined relative importance assigned to certain important events.

* * * * *